(12) United States Patent
Schoolcraft

(10) Patent No.: US 9,651,127 B2
(45) Date of Patent: May 16, 2017

(54) SPLIT POWER INFINITELY VARIABLE TRANSMISSION ARCHITECTURE INCORPORATING A PLANETARY TYPE BALL VARIATOR WITH LOW PART COUNT

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 214 days.

(21) Appl. No.: 14/517,374

(22) Filed: Oct. 17, 2014

(65) Prior Publication Data
US 2016/0109002 A1 Apr. 21, 2016

(51) Int. Cl.
F16H 37/08 (2006.01)
F16H 37/02 (2006.01)
F16H 3/66 (2006.01)

(52) U.S. Cl.
CPC ......... *F16H 37/022* (2013.01); *F16H 37/086* (2013.01); *F16H 3/66* (2013.01); *F16H 2037/0873* (2013.01); *F16H 2037/0893* (2013.01); *F16H 2200/2007* (2013.01);
(Continued)

(58) Field of Classification Search
None
See application file for complete search history.

(56) References Cited

U.S. PATENT DOCUMENTS

| 2,347,873 A | 5/1944 | Bloomfield |
| 2,410,818 A | 11/1946 | Grant |
| 2,554,221 A | 5/1951 | Stephenson et al. |

(Continued)

FOREIGN PATENT DOCUMENTS

| DE | 102007013493 A1 | 9/2008 |
| DE | 102012216277 A1 | 3/2014 |

(Continued)

OTHER PUBLICATIONS

International Search Report and Written Opinion received for PCT International Application No. PCT/US2013/045580, completed Oct. 27, 2013, 3 pages.

(Continued)

*Primary Examiner* — Justin Holmes
(74) *Attorney, Agent, or Firm* — Barnes & Thornburg LLP

(57) ABSTRACT

A transmission includes a housing, an input shaft, an output shaft, a first gearset, a second gearset, a variable-ratio unit, a first torque transmitting mechanism, and a bypass torque transmitting mechanism. The first gearset is arranged between the input shaft and the output shaft, and the second gearset is coupled to the first gearset between the input shaft and the output shaft. The variable-ratio unit is configured to transmit power between (i) a first member coupled to the input shaft and the first gearset and (ii) a second member coupled to the first gearset. The first torque transmitting mechanism is selectively engageable to couple the second gearset to the housing. The bypass torque transmitting mechanism is selectively engageable to couple the first member to the second member to bypass the variable-ratio unit.

13 Claims, 15 Drawing Sheets

(52) U.S. Cl.
CPC ............. *F16H 2200/2035* (2013.01); *F16H 2200/2038* (2013.01); *F16H 2200/2097* (2013.01)

(56) References Cited

U.S. PATENT DOCUMENTS

| | | | |
|---|---|---|---|
| 2,583,843 A | 1/1952 | Herrick | |
| 2,596,654 A | 5/1952 | Clark et al. | |
| 2,718,292 A | 9/1955 | Meilander et al. | |
| 2,841,330 A | 7/1958 | Brewer et al. | |
| 3,324,744 A | 6/1967 | Roper | |
| 3,410,157 A | 11/1968 | Livezey | |
| 3,432,016 A | 3/1969 | Vogt | |
| 3,481,436 A | 12/1969 | Wilkowski | |
| 3,631,741 A | 1/1972 | Kelbel | |
| 4,004,473 A | 1/1977 | Pearce et al. | |
| 4,107,776 A | 8/1978 | Beale | |
| 4,114,478 A | 9/1978 | Clauss | |
| 4,205,563 A | 6/1980 | Gorrell | |
| 4,258,585 A | 3/1981 | Orshansky, Jr. et al. | |
| 4,361,217 A | 11/1982 | Bieber et al. | |
| 4,381,828 A | 5/1983 | Lunn et al. | |
| 4,742,733 A | 5/1988 | Schreiner | |
| 4,754,664 A | 7/1988 | Dick | |
| 4,813,524 A | 3/1989 | Reik | |
| 4,856,374 A | 8/1989 | Kreuzer | |
| 4,950,208 A | 8/1990 | Tomlinson | |
| 5,011,463 A | 4/1991 | Jarchow et al. | |
| 5,062,050 A | 10/1991 | Petzold et al. | |
| 5,152,726 A | 10/1992 | Lederman | |
| 5,355,981 A | 10/1994 | Itoh et al. | |
| 5,407,024 A | 4/1995 | Watson et al. | |
| 5,441,130 A | 8/1995 | Ha | |
| 5,538,121 A | 7/1996 | Hering | |
| 5,584,776 A | 12/1996 | Weilant et al. | |
| 5,653,322 A | 8/1997 | Vasa et al. | |
| 5,662,198 A | 9/1997 | Kojima et al. | |
| 5,704,867 A | 1/1998 | Bowen | |
| 5,771,477 A | 6/1998 | Showalter et al. | |
| 5,833,566 A | 11/1998 | Showalter | |
| 5,884,526 A | 3/1999 | Fogelberg | |
| 5,888,161 A * | 3/1999 | McCarrick | F16H 37/022 475/207 |
| 5,893,812 A | 4/1999 | Narai et al. | |
| 5,918,715 A | 7/1999 | Ruth et al. | |
| 5,992,592 A | 11/1999 | Showalter | |
| 6,062,361 A | 5/2000 | Showalter | |
| 6,063,002 A * | 5/2000 | Nobumoto | F16H 61/6648 477/41 |
| 6,149,540 A | 11/2000 | Johnson et al. | |
| 6,149,543 A | 11/2000 | Breen | |
| 6,155,395 A | 12/2000 | Braford | |
| 6,171,210 B1 * | 1/2001 | Miyata | F16H 37/086 475/216 |
| 6,251,045 B1 | 6/2001 | Oliveira et al. | |
| 6,301,538 B1 | 10/2001 | Kirchhoffer et al. | |
| 6,358,178 B1 | 3/2002 | Wittkopp | |
| 6,394,925 B1 | 5/2002 | Wontner et al. | |
| 6,460,671 B1 | 10/2002 | Karambelas et al. | |
| 6,585,619 B2 | 7/2003 | Henzler et al. | |
| 6,588,559 B2 | 7/2003 | Blair | |
| 6,672,442 B2 | 1/2004 | Kato et al. | |
| 6,679,367 B2 | 1/2004 | Baker et al. | |
| 6,719,659 B2 | 4/2004 | Geiberger et al. | |
| 6,726,590 B2 | 4/2004 | Henzler et al. | |
| 6,761,658 B1 | 7/2004 | Stettler, Jr. | |
| 6,790,153 B2 | 9/2004 | Goto | |
| 6,834,750 B2 | 12/2004 | Baker et al. | |
| 6,846,257 B2 | 1/2005 | Baker et al. | |
| 6,855,086 B2 | 2/2005 | Elser et al. | |
| 6,949,045 B2 | 9/2005 | Wafzig et al. | |
| 7,052,430 B2 | 5/2006 | Stevenson et al. | |
| 7,189,182 B2 | 3/2007 | Stevenson et al. | |
| 7,195,576 B2 | 3/2007 | Toyoda et al. | |
| 7,204,337 B2 | 4/2007 | Wildfellner | |
| 7,217,216 B2 | 5/2007 | Inoue | |
| 7,219,569 B2 | 5/2007 | Jastrzembowski et al. | |
| 7,326,146 B2 | 2/2008 | Miyata et al. | |
| 7,347,801 B2 | 3/2008 | Guenter et al. | |
| 7,407,459 B2 | 8/2008 | Greenwood et al. | |
| 8,083,631 B2 | 12/2011 | Shiohara | |
| 8,142,323 B2 | 3/2012 | Tsuchiya et al. | |
| 8,152,673 B2 | 4/2012 | Yanay | |
| 8,298,111 B2 | 10/2012 | Kato et al. | |
| 8,298,112 B2 | 10/2012 | Takada | |
| 8,617,020 B2 | 12/2013 | Winter | |
| 8,758,181 B2 | 6/2014 | Calvert | |
| 8,845,477 B2 | 9/2014 | Koch et al. | |
| 8,986,150 B2 | 3/2015 | Versteyhe et al. | |
| 8,996,263 B2 | 3/2015 | Quinn, Jr. et al. | |
| 9,133,924 B2 | 9/2015 | Schoolcraft | |
| 9,163,705 B1 | 10/2015 | Hwang et al. | |
| 2002/0005325 A1 | 1/2002 | Yamada | |
| 2003/0051959 A1 | 3/2003 | Blair | |
| 2003/0199353 A1 | 10/2003 | Bowen | |
| 2003/0226415 A1 | 12/2003 | Baker et al. | |
| 2004/0104096 A1 | 6/2004 | Genise | |
| 2006/0025272 A1 | 2/2006 | Pelouch | |
| 2006/0189435 A1 | 8/2006 | Flaig et al. | |
| 2007/0272455 A1 | 11/2007 | Lang et al. | |
| 2007/0287572 A1 | 12/2007 | Tabata et al. | |
| 2008/0280722 A1 | 11/2008 | Phillips et al. | |
| 2009/0118912 A1 | 5/2009 | Hugenroth et al. | |
| 2009/0203486 A1 | 8/2009 | Murray | |
| 2009/0253543 A1 | 10/2009 | Foster et al. | |
| 2010/0093479 A1 | 4/2010 | Carter et al. | |
| 2010/0151984 A1 | 6/2010 | Viitasalo et al. | |
| 2011/0111910 A1 | 5/2011 | Ideshio et al. | |
| 2011/0144872 A1 | 6/2011 | Long et al. | |
| 2011/0172051 A1 * | 7/2011 | Hoffman | F16H 37/086 475/207 |
| 2011/0300983 A1 | 12/2011 | Kurokawa | |
| 2012/0072084 A1 | 3/2012 | Stoller et al. | |
| 2013/0018557 A1 | 1/2013 | Wilson et al. | |
| 2013/0281244 A1 * | 10/2013 | Vaughn | F16H 47/04 475/72 |
| 2013/0338888 A1 | 12/2013 | Long et al. | |
| 2013/0338889 A1 | 12/2013 | Long et al. | |
| 2013/0338893 A1 | 12/2013 | Long et al. | |
| 2014/0038766 A1 | 2/2014 | Koch et al. | |
| 2014/0262672 A1 | 9/2014 | Raszkowski et al. | |
| 2014/0274540 A1 | 9/2014 | Schoolcraft | |

FOREIGN PATENT DOCUMENTS

| | | |
|---|---|---|
| EP | 1519084 A2 | 9/2004 |
| EP | 2113056 A1 | 11/2009 |
| JP | 2007232125 A | 9/2007 |
| JP | 2008075706 A | 4/2008 |
| WO | 9849455 A2 | 11/1998 |
| WO | 2010048029 A2 | 4/2010 |
| WO | 2013095213 A1 | 6/2013 |
| WO | 2014039900 | 3/2014 |
| WO | 2014125050 | 8/2014 |

OTHER PUBLICATIONS

U.S. Appl. No. 61/660,666, dated Dec. 16, 2009, (31 pages).
Utility U.S. Appl. No. 14/517,400, dated Oct. 17, 2014.
Utility U.S. Appl. No. 14/517,364 dated Oct. 17, 2014.
Utility U.S. Appl. No. 14/517,380, dated Oct. 17, 2014.
Utility U.S. Appl. No. 14/517,410, dated Oct. 17, 2014.
Utility U.S. Appl. No. 14/517,426, dated Oct. 17, 2014.
Search Report and Written Opinion from the International Searching Authority for Application No. PCT/US2015/056009, dated Feb. 25, 2016, 13 pages.
Search Report and Written Opinion for Application No. PCT/US2015/055999, dated Dec. 4, 2015, 10 pages.
Search Report and Written Opinion for Application No. PCT/US2015/055996, dated Jan. 4, 2016, 7 pages.
Search Report and Written Opinion for Application No. PCT/US2015/055993, dated Jan. 6, 2016, 8 pages.

(56) References Cited

OTHER PUBLICATIONS

Search Report and Written Opinion for Application No. PCT/US2015/056003, dated Jan. 6, 2016, 8 pages.
Search Report and Written Opinion for Application No. PCT/US2015/056007, dated Jan. 28, 2016, 8 pages.

\* cited by examiner

| REGIME | CLUTCHES APPLIED | | | TRANSMISSION RATIO IN MODE | | | REGIME SHOWN IN FIG(S) |
|---|---|---|---|---|---|---|---|
| | C1 | C2 | C3 | MIN | FIXED | MAX | |
| MODE 1 | X | | | -0.25 | | 0.556 | 6A,6B,13A,13B |
| BYPASS 1 | X | | X | | 0.268 | | 7A,14A |
| SYNC 1-2 | X | X | X | | 0.556 | | 7B,14B |
| MODE 2 | | X | X | 0.556 | | 1.8 | 8A,15A |
| BYPASS 2 | | X | X | | 1 | | 8B,15B |

FIG. 5

SPLIT POWER INFINITELY VARIABLE TRANSMISSION ARCHITECTURE INCORPORATING A PLANETARY TYPE BALL VARIATOR WITH LOW PART COUNT

TECHNICAL FIELD

The present disclosure relates generally to infinitely variable transmissions, and more particularly, to the architectures of infinitely variable transmissions including ratio varying units.

BACKGROUND

Continuously variable transmissions (CVTs) utilize a ratio varying unit (e.g., a "variator") to provide a continuous variation of transmission ratio rather than a series of predetermined ratios as provided in typical transmissions. The variator of a typical CVT is coupled between the transmission input and the transmission output via gearing and one or more clutches.

In one type of continuously variable transmission, commonly referred to as an infinitely variable transmission (IVT), a zero output speed can be obtained independently of the rotational input speed provided to the transmission by the drive unit in a geared neutral mode. Infinitely variable transmissions may use a variator and a planetary gear train to direct power flow along multiple power paths. For instance, power may flow along a first path through the variator and along a second path through the planetary gear train. Power may also be recirculated to the variator, thereby increasing the load experienced by the variator during the operation of the infinitely variable transmission. Many current architectures for infinitely variable transmissions subject the variator to the entire power load recirculated through the infinitely variable transmission.

SUMMARY

According to one aspect of the present disclosure, a transmission includes a housing, an input shaft, an output shaft, a first gearset, a second gearset, a variable ratio-unit, a first torque transmitting mechanism, and a bypass torque transmitting mechanism. The input shaft is configured to receive torque from a drive unit. The output shaft is configured to transmit torque to a load. The first gearset is arranged between the input shaft and the output shaft and is configured to receive torque from the input shaft. The second gearset is coupled to the first gearset between the input shaft and the output shaft. The variable-ratio unit is configured to transmit power between (i) a first member coupled to the input shaft and a first element of the first gearset and (ii) a second member coupled to a second element of the first gearset. The first torque transmitting mechanism is arranged between the second gearset and the housing and is moveable between (i) a disengaged position in which the second gearset is decoupled from the housing and (ii) an engaged position in which the second gearset is coupled to the housing such that torque is transmitted through the second gearset. The bypass torque transmitting mechanism is arranged between the first member and the second member and is moveable between (i) a disengaged position in which the first member is decoupled from the second member and (ii) an engaged position in which the first member is coupled to the second member such that the variable-ratio unit is bypassed and torque is transmitted between the first member and the second member through the bypass torque transmitting mechanism.

In some embodiments, the transmission may further include a second torque transmitting mechanism arranged between the second member and the output shaft. The second torque transmitting mechanism may be movable between (i) a disengaged position in which the second member is decoupled from the output shaft and (ii) an engaged position in which the second member is coupled to the output shaft such that torque is transmitted from the second member to the output shaft through the second torque transmitting mechanism. When the first torque transmitting mechanism is in the engaged position and the bypass and second torque transmitting mechanisms are in their respective disengaged positions, the variable-ratio unit may be operable to provide a first range of speed ratios. When the second torque transmitting mechanism is in the engaged position and the first and bypass torque transmitting mechanisms are in their respective disengaged positions, the variable-ratio unit may be operable to provide a second range of speed ratios. The first range of speed ratios and the second range of speed ratios may overlap. In some embodiments, (i) the transmission may be operable to provide a first plurality of input speeds at the input shaft and a second plurality of output speeds at the output shaft, and (ii) the first range of speed ratios may include a ratio in which one of the second plurality of output speeds is equal to zero for the first plurality of input speeds. In some embodiments, when the first torque transmitting mechanism and the second torque transmitting mechanism are in their respective engaged positions, a fixed speed ratio may be defined between the input shaft and the output shaft. In some embodiments, when the bypass torque transmitting mechanism is in the engaged position and one of the first and second torque transmitting mechanisms is in the engaged position, a fixed speed ratio may be defined between the input shaft and the output shaft.

In some embodiments, each of the first and second gearsets may include a sun gear, a ring gear, a carrier, and a plurality of planet gears. The sun gear of the first gearset may be coupled to the sun gear of the second gearset.

In some embodiments, the transmission may further include a third gearset coupled to the housing and arranged between the first gearset and the output shaft. In some embodiments, the transmission may further include a second torque transmitting mechanism arranged between the first gearset and the third gearset. The second torque transmitting mechanism may be movable between (i) a disengaged position in which an element of the first gearset is decoupled from the third gearset and (ii) an engaged position in which the element of the first gearset is coupled to third gearset. In some embodiments, the transmission may further include a second torque transmitting mechanism arranged between the first gearset and the second gearset. Each of the first and second gearsets may include a sun gear, a ring gear, a carrier, and a plurality of planet gears, and the second torque transmitting mechanism may be operable to couple the sun gear of the first gearset to the sun gear of the second gearset. In some embodiments, a second torque transmitting mechanism may be arranged between the variable-ratio unit and the first gearset. The second torque transmitting mechanism may be movable between (i) a disengaged position in which the variable-ratio unit is decoupled from an element of the first gearset and (ii) an engaged position in which the variable-ratio unit is coupled to the element of the first gearset.

In some embodiments, the first member may couple an input ring of the variable-ratio unit to the input shaft and the first element of the first gearset. The second member may couple an output ring of the variable-ratio unit to the second element of the first gearset.

According to another aspect of the present disclosure, a transmission includes a housing, an input shaft, an output shaft, a first planetary gearset, a second planetary gearset, a variable-ratio unit, a second torque transmitting mechanism, and a first torque transmitting mechanism. The input shaft is configured to receive torque from a drive unit. The output shaft is configured to transmit torque to a load. The first planetary gearset is arranged between the input shaft and the output shaft and is configured to receive torque from the input shaft. The first planetary gearset includes a first member coupled to the input shaft, a second member, and a third member. The second planetary gearset is arranged between the first planetary gearset and the output shaft and is configured to receive torque output from the first planetary gearset. The second planetary gearset includes a first member coupled to the second member of the first planetary gearset, a second member, and a third member. The variable-ratio unit is arranged between the input shaft and the first planetary gearset and is coupled to the input shaft. The second torque transmitting mechanism is arranged between the second planetary gearset and the housing and is moveable between (i) a disengaged position in which the second member of the second planetary gearset is decoupled from the housing and (ii) an engaged position in which the second member of the second planetary gearset is coupled to the housing such that torque is transmitted from the first planetary gearset to the output shaft through the second planetary gearset. The first torque transmitting mechanism is arranged between the third member of the first planetary gearset and the third member of the second planetary gearset and is moveable between (i) a disengaged position in which the third member of the first planetary gearset is decoupled from the third member of the second planetary gearset and (ii) an engaged position in which the third member of the first planetary gearset is coupled to the third member of the second planetary gearset such that torque is transmitted from the third member of the first planetary gearset to the third member of the second planetary gearset through the second torque transmitting mechanism and thereafter to the output shaft.

In some embodiments, the transmission may further comprise a third planetary gearset arranged between the second planetary gearset and the output shaft that is configured to receive torque output from the second planetary gearset. The third planetary gearset may include a first member coupled to the first member of the second planetary gearset, a second member coupled to the housing, and a third member coupled to the output shaft. Torque may be transmitted from the first planetary gearset to the output shaft through the second planetary gearset and the third planetary gearset when the second torque transmitting mechanism is in the engaged position. The variable-ratio unit may be decoupled from the third member of the first planetary gearset when the first torque transmitting mechanism is in the disengaged position. The variable-ratio unit may be coupled to the third member of the first planetary gearset when the first torque transmitting mechanism is in the engaged position such that torque is transmitted from the variable-ratio unit to the third member of the first planetary gearset through the first torque transmitting mechanism.

According to another aspect of the present disclosure, a transmission includes a housing, an input shaft, an output shaft, a first planetary gearset, a second planetary gearset, a third planetary gearset, a variable-ratio unit, a second torque transmitting mechanism, and a first torque transmitting mechanism. The input shaft is configured to receive torque from a drive unit. The output shaft is configured to transmit torque to a load. The first planetary gearset is arranged between the input shaft and the output shaft and is configured to receive torque from the input shaft. The first planetary gearset includes a first member, a second member coupled to the input shaft, and a third member. The second planetary gearset is arranged between the first planetary gearset and the output shaft and is configured to receive torque output from the first planetary gearset. The second planetary gearset includes a first member, a second member coupled to the third member of the first planetary gearset, and a third member. The third planetary gearset is arranged between the second planetary gearset and the output shaft and is configured to receive torque output from the second planetary gearset. The third planetary gearset includes a first member coupled to the first member of the second planetary gearset, a second member coupled to the housing, and a third member coupled to the output shaft. The variable-ratio unit is arranged between the input shaft and the first planetary gearset and is coupled to (i) the input shaft and (ii) the third member of the first planetary gearset. The second torque transmitting mechanism is arranged between the second planetary gearset and the housing and is moveable between (i) a disengaged position in which the third member of the second planetary gearset is decoupled from the housing and (ii) an engaged position in which the third member of the second planetary gearset is coupled to the housing such that torque is transmitted from the first planetary gearset to the third planetary gearset through the second planetary gearset. The first torque transmitting mechanism is arranged between the first member of the first planetary gearset and the first member of the second planetary gearset and is moveable between (i) a disengaged position in which the first member of the first planetary gearset is decoupled from the first member of the second planetary gearset and (ii) an engaged position in which the first member of the first planetary gearset is coupled to the first member of the second planetary gearset such that torque is transmitted from the first member of the first planetary gearset to the first member of the second planetary gearset through the first torque transmitting mechanism and thereafter to the third planetary gearset.

In some embodiments, the transmission may further comprise a bypass torque transmitting mechanism arranged between an input of the variable-ratio unit and an output of the variable-ratio unit. The bypass torque transmitting mechanism may be movable between (i) a disengaged position in which the input of the variable-ratio unit is decoupled from the output of the variable-ratio unit and (ii) an engaged position in which the input of the variable-ratio unit is coupled to the output of the variable-ratio unit such that the variable-ratio unit is bypassed and torque is transmitted between the input and the output through the bypass torque transmitting mechanism.

According to another aspect of the present disclosure, a transmission is operable in a plurality of operating modes and includes an input shaft, a plurality of gearsets, a variable-ratio unit, and a plurality of torque-transmitting mechanisms. The input shaft is configured to receive torque from a drive unit and transmit the torque to an output shaft of the transmission. The plurality of gearsets is arranged between the input shaft and the output shaft. The plurality of gearsets includes a first planetary gearset coupled to the input shaft and a second planetary gearset coupled to the output shaft. The variable-ratio unit is coupled to the first planetary gearset and is configured to receive a power load. The plurality of torque-transmitting mechanisms includes a first clutch and a variator bypass clutch. The first clutch and the variator bypass clutch are contemporaneously engageable in at least one operating mode to define a power path from the input shaft to the output shaft through each of the first and second planetary gearsets. The variator bypass clutch is engageable to bypass the variable-ratio unit so that power transmitted along the first power path is transmitted to the variator bypass clutch rather than the variable-ratio unit. The power load received by the variable-ratio unit is reduced in the at least one operating mode when the first clutch is engaged and the variator bypass clutch is engaged.

In some embodiments, each of the first and second planetary gearsets may include a sun gear, a ring gear, a carrier, and a plurality of planet gears. The sun gear of the first planetary gearset may be coupled to the sun gear of the second planetary gearset. The first clutch may be engageable to couple the sun gear of the first planetary gearset to the sun gear of the second planetary gearset.

In some embodiments, the variable-ratio unit may include an input ring and an output ring. The output ring may be coupled to the ring gear of the first planetary gearset. The first clutch may be engageable to couple the output ring to the ring gear of the first planetary gearset.

In some embodiments, the carrier of the first planetary gearset may be coupled to the input shaft. The input ring of the variable-ratio unit may be coupled to the input shaft. The first clutch may be engageable to couple the carrier of the first planetary gearset to the input shaft.

In some embodiments, the plurality of torque transmitting mechanisms may include a second clutch. The second clutch may be engageable to couple the ring gear of the first planetary gearset to the carrier of the second planetary gearset.

In some embodiments, the transmission may also include a transmission housing. The plurality of torque transmitting mechanisms may include a second clutch, and the plurality of gearsets may include a third planetary gearset. The third planetary gearset may have a ring gear, a sun gear, a carrier, and a plurality of planet gears. The second clutch may be engageable to couple the ring gear of the third planetary gearset to the transmission housing. The ring gear of the first planetary gearset may be coupled to the carrier of the third planetary gearset.

According to another aspect of the present disclosure, a transmission is operable in a plurality of operating modes and includes an input shaft, a plurality of gearsets, a variable-ratio unit, and a plurality of torque-transmitting mechanisms. The input shaft is configured to receive torque from a drive unit and transmit the torque to an output shaft of the transmission. The plurality of gearsets is arranged between the input shaft and the output shaft. The plurality of gearsets includes a first planetary gearset coupled to the input shaft and a second planetary gearset coupled to the output shaft. The variable-ratio unit is coupled to the first planetary gearset and configured to receive a power load. The plurality of torque transmitting mechanisms includes a first clutch, a second clutch, and a variator bypass clutch. The first clutch and the second clutch are contemporaneously engageable in at least one operating mode to define a first power path from the input shaft to the output shaft through each of the first and second planetary gearsets. The variator bypass clutch is engageable to reduce the power load received by the variable-ratio unit. The power load received by the variable-ratio unit is reduced in the at least one operating mode when the first clutch is engaged and the second clutch is engaged.

In some embodiments, in the at least one operating mode, contemporaneously engaging the first clutch and the second clutch may define a second power path from the input shaft to the output shaft through only the first planetary gearset. The plurality of gearsets may include a third gearset. Contemporaneously engaging the first clutch and the second clutch in the at least one operating mode may define a third power path from the input shaft to the output shaft through each of the first, second, and third gearsets.

In some embodiments, each of the first and second planetary gearsets may include a sun gear, a ring gear, a plurality of planet gears, and a carrier. The sun gear of the first planetary gearset may be coupled to the sun gear of the second planetary gearset. The second clutch may be engageable to couple the ring gear of the first planetary gearset to the carrier of the second planetary gearset.

In some embodiments, the transmission may also include a transmission housing. The first clutch may be engageable to couple the ring gear of the second planetary gearset to the transmission housing.

In some embodiments, the third gearset may be a planetary gearset that includes a sun gear, a ring gear, a plurality of planet gears, and a carrier. The ring gear of the first planetary gearset may be coupled to the carrier of the third planetary gearset. The first clutch may be engageable to couple the sun gear of the first planetary gearset to the sun gear of the third planetary gearset. The sun gear of the third planetary gearset may be coupled to the sun gear of the second planetary gearset. The ring gear of the second planetary gearset may be coupled to the transmission housing.

According to another aspect of the present disclosure, a transmission includes an input shaft, a plurality of gearsets, a variable-ratio unit, and a plurality of torque-transmitting mechanisms. The input shaft is configured to receive torque from a drive unit and transmit the torque to an output shaft of the transmission. The plurality of gearsets is arranged between the input shaft and the output shaft and includes a first planetary gearset coupled to the input shaft and a second planetary gearset coupled to the output shaft. The variable-ratio unit is coupled to the first planetary gearset and is configured to receive a power load. The plurality of torque-transmitting mechanisms includes a first clutch, a second clutch, and a variator bypass clutch. The first clutch and the second clutch are contemporaneously engageable in at least one operating mode to define a first power path from the input shaft to the output shaft through each of the first and second planetary gearsets. The variator bypass clutch is engageable to reduce the power load received by the variable-ratio unit. The power load received by the variable-ratio unit is reduced in the at least one operating mode in which the first clutch is engaged and the second clutch is engaged. The variable-ratio unit includes an input ring and an output ring. The variator bypass clutch is engageable to couple the output ring of the variable-ratio unit to the input shaft. The first planetary gearset includes a sun gear, a ring gear, a plurality of planet gears, and a carrier. The carrier of the first planetary gearset is coupled to the input shaft. The output ring is coupled to the ring gear of the first planetary gearset. The transmission achieves a fixed transmission ratio in the at least one operating mode.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a table showing the various operating modes achievable by the infinitely variable transmission of FIG. 1 and the transmission ratios associated with each mode;

DETAILED DESCRIPTION OF THE DRAWINGS

Figure 1:
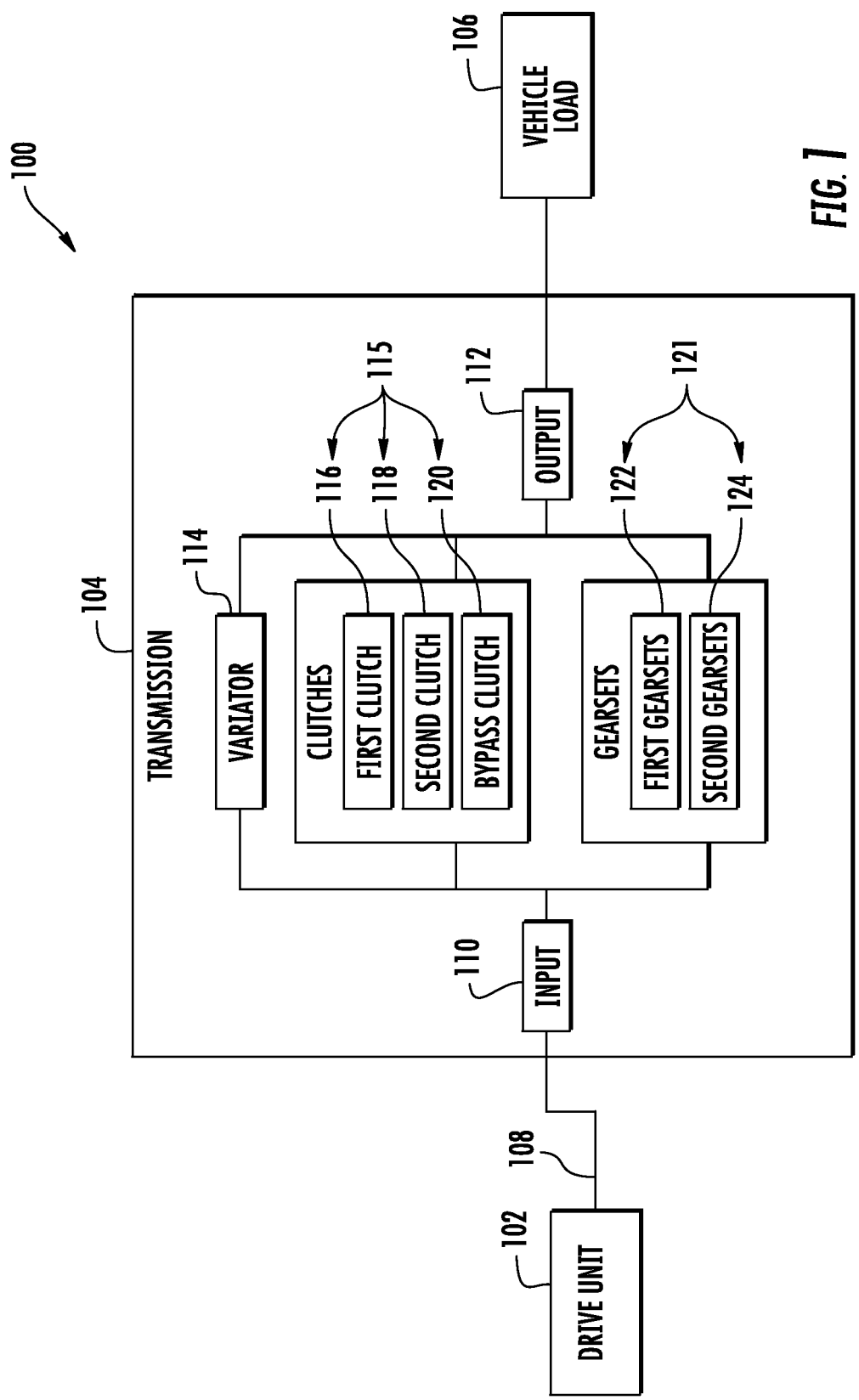
FIG. 1 is a simplified block diagram of an infinitely variable transmission including a variator in a first embodiment of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 102, a transmission 104 coupled to the drive unit 102, and a vehicle load 106 coupled to the transmission 104 in a first embodiment of the present disclosure. The drive unit 102 may be embodied as any type of motor or internal combustion engine having a reciprocating or a rotary configuration that provides rotational power to the transmission 104 and therethrough to the vehicle load 106. For instance, the drive unit 102 may be embodied as a four-stroke piston engine, a diesel engine, or a rotary engine. The vehicle load 106 may be embodied as, or otherwise include, drive wheels, caterpillar tracks, propels, etc. that impart the motor vehicle 100 with locomotion when driven by the drive unit 102 via the transmission 104. Additionally, the vehicle load 106 may be embodied as an auxiliary gearbox (e.g. a transfer case or drop box) or a power take-off device, such as a pump, mixer, lifter, shoveler, compressor, compactor, or blower.

In use, rotational power is generated by the drive unit 102 is transmitted to the transmission 104 via a drive unit output shaft 108 included in the drive unit 102. The drive unit output shaft 108 is coupled to a transmission input shaft 110 included in the transmission 104. Additionally, rotational power received by the transmission 104 at the input shaft 110 is transmitted to a transmission output shaft 112 and therefrom to the vehicle load 106.

The transmission 104 ensures the controlled application of rotational power generated by the drive unit 102 to the vehicle load 106. The transmission 104, as discussed in more detail below, includes a plurality of gearsets that enable speed and torque generated by the drive unit 102 to be converted for use by the vehicle load 106.

The transmission 104 is operable in a plurality of operating modes to transmit rotational power supplied by the drive unit 102 from the transmission input shaft 110 to the transmission output shaft 112. Each operating mode enables at least one ratio of input speed (i.e., at the transmission input shaft 110) to output speed (i.e., at the transmission output shaft 112) to be achieved. As discussed below, operating modes of the transmission 104 in which a variator 114 is utilized enable a range of transmission ratios to be achieved whereas operating modes in which the variator 114 is not utilized enable only a single transmission ratio to be achieved.

The transmission 104 of FIG. 1 is illustratively embodied as an infinitely variable transmission. The transmission 104 includes the variator 114, a plurality of clutches 115, and a plurality of gearsets 121 in addition to the input shaft 110 and the output shaft 112. Illustratively, the plurality of clutches 115 includes a first clutch 116, a second clutch 118, and a variator bypass clutch 120. Additionally, the illustrative plurality of gearsets 121 includes a first gearset 122 and a second gearset 124.

The infinitely variable transmission 104 is operable, as discussed below, to split rotational power supplied from the drive unit 102 between the variator 114 and the plurality of gearsets 121. The transmission 104 is also operable, in one operating mode, to achieve zero output speed at the output shaft 112 in a mode referred herein to as a "geared neutral mode." The transmission 104 is further operable to recirculate rotational power directed toward the output shaft 112 back toward the input shaft 110 in multiple operating modes. As discussed below, power recirculated back toward the input shaft 110 and received by the variator 114 is reduced as a result of the architecture of the infinitely variable transmission 104. In this manner, the infinitely variable transmission 104 is similar to the infinitely variable transmission disclosed in U.S. Provisional Patent App. Ser. No. 61/798,476 entitled "SPLIT POWER INFINITELY VARIABLE TRANSMISSION ARCHITECTURE" by Brian Schoolcraft, the entirety of which is hereby incorporated by reference.

The variator 114, the plurality of clutches 115, and the plurality of gearsets 121 included in the transmission 104 are arranged between the input shaft 110 and the output shaft 112 of the transmission 104. Each of the gearsets included in the plurality of gearsets 121 may be supported by a mainshaft of the transmission 104 and may be capable of rotating freely and independently thereof. Each of the clutches may be selectively engaged to transmit power along a particular path between components included in the transmission 104 as discussed below.

Each of the plurality of clutches 115 included in the transmission 104 is embodied as a torque-transmitting device configured to define a torque transfer path between components included in the transmission 104. By selectively engaging each of the plurality of clutches 115 in combination with one another, the plurality of clutches 115 define a torque transfer path between the input shaft 110 and the output shaft 112 and thereby effect a change from one operating mode to another. In one example, one or more of the plurality of clutches 115 may be embodied as a three-position dog clutch such as the three-position dog clutch disclosed in U.S. Provisional Patent App. Ser. No. 61/799,200 entitled "THREE-POSITION DOG CLUTCH" by Brian Schoolcraft, the entirety of which is hereby incorporated by reference. In other embodiments, one or more of the plurality of clutches 115 may be embodied as multi-plate wet clutches or controllable mechanical diodes, the engagement/disengagement of which are used to accomplish changes between operating modes. As discussed below, in the illustrative embodiment, the second clutch 118 and the variator bypass clutch 120 are rotating clutches configured to transmit torque therethrough while the first clutch 116 is a stationary, non-rotating clutch. Additionally, the variator bypass clutch 120, as discussed below, is engageable to lock a variator input ring 126 to a variator output ring 130 so that the variator 114 achieves a 1:1 ratio (i.e., variator input speed is equal to variator output speed). When the variator bypass clutch 120 is engaged, the power load experienced by the variator 114 is removed, and all the power transmitted to the variator 114 flows instead through the variator bypass clutch 120.

Figure 2:
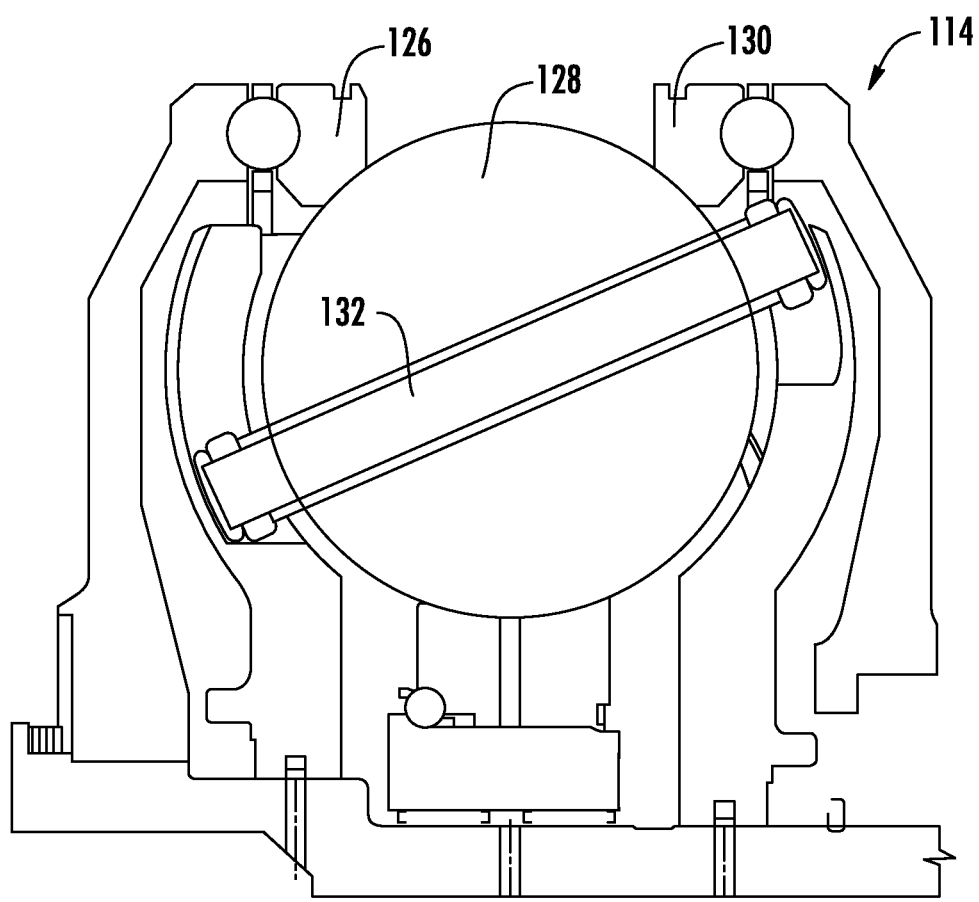
FIG. 2 is a side elevation view of the variator of the infinitely variable transmission of FIG. 1.

Referring now to FIG. 2, in the illustrative embodiment, the variator 114 is embodied as a planetary-type ball variator and includes the input ring 126 and the output ring 130. Each of the variator rings 126, 130 are spaced apart as shown in FIG. 2 to permit a ball 128 to be positioned between the rings 126, 130. The ball 128 is configured to tilt between the rings 126, 130 to vary the ratio achieved using the variator 114. An axle 132 encircles the ball 128 as shown in FIG. 2. The ball 128 is tilted by continuously tilting the axle 132 so that continuously-variable torque output is produced using the variator 114.

Figure 3:
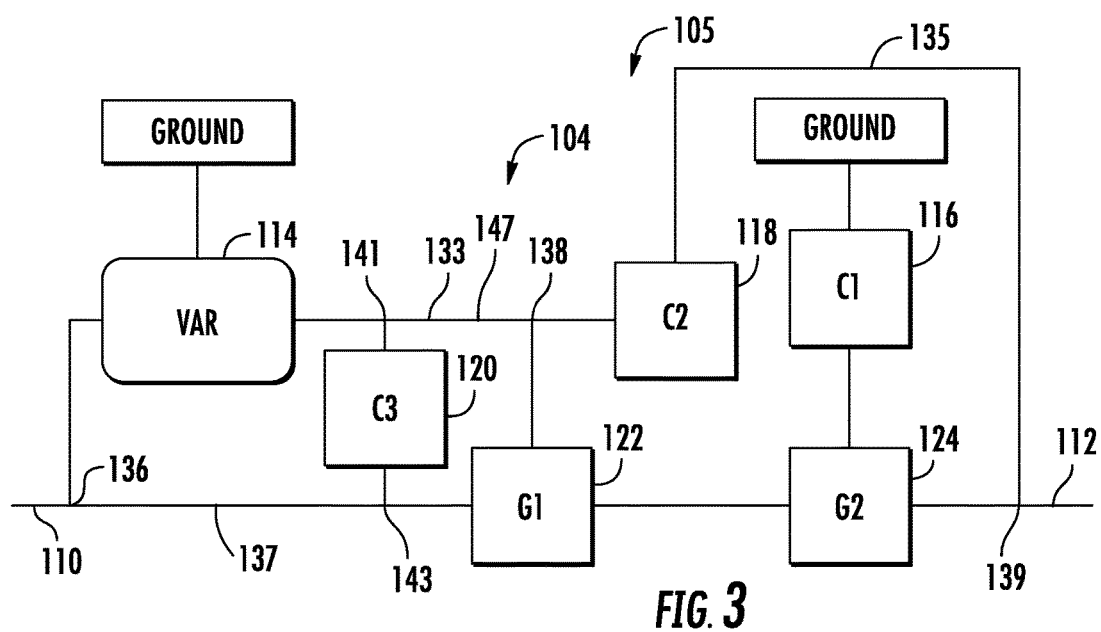
FIG. 3 is a block diagrammatic view of the architecture of the infinitely variable transmission of FIG. 1 showing various components included in the infinitely variable transmission.
Figure 4:
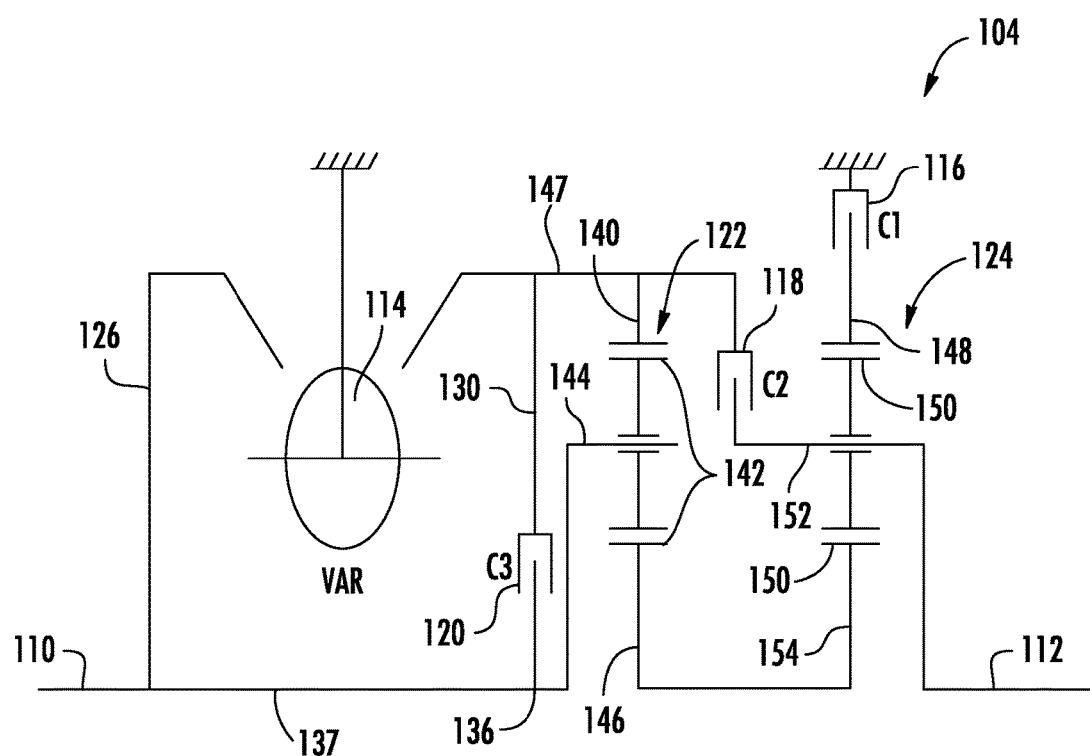
FIG. 4 is a schematic of the architecture of FIG. 3 and the associated transmission components.

The variator 114 is illustratively configured to transmit torque between a first member 137 coupled to the input shaft 110 and a first element of the first gearset 122 (i.e., a carrier 144) and a second member 147 coupled to a second element of the first gearset 122 (i.e., a ring gear 140). The members 137, 147 are also coupled to the input and output rings 126, 130, respectively, and the variator bypass clutch 120 is arranged between the members 137, 147 as best seen in FIGS. 3-4. The variator bypass clutch 120 is disengageable to decouple the first and second members 137, 147 from one another and engageable to couple the first and second members 137, 147 to one another such that the variator 114 is bypassed and torque is transmitted between the first and second members 137, 147 through the variator bypass clutch 120.

Referring now to FIG. 3, the architecture of the transmission 104 is shown in a configuration 105 in a first embodiment of the disclosure. In the illustrative configuration 105, each gearset of the plurality of gearsets 121 is represented by a corresponding box (i.e., G1 and G2) and the variator 114 is designated as "VAR." G1 designates the first gearset 122 and G2 designates the second gearset 124. Each clutch of the plurality of clutches 115 is also represented by a box such that the following designations apply: C1 (the first clutch 116), C2 (the second clutch 118), and C3 (the variator bypass clutch 120).

It should be appreciated that the architecture of the transmission 104 defines a plurality of power paths along which power may be transmitted between components included in the transmission 102 during one or more operational modes. In the illustrative embodiments, the plurality of power paths includes a power path 133 and a power path 135. As illustrated in FIGS. 6A-8B, power flow along the power path 133 is bi-directional in the plurality of operating modes of the transmission 104, and power flow along the power path 135 is uni-directional in the plurality of operating modes of the transmission 104. In each operating mode of the transmission 104, power is transmitted between the input shaft 110 and the output shaft 112 along at least one of the power path 133 and the power path 135. As indicated below, contemporaneous power flow from the input shaft 110 to the output shaft 112 along more than one of the power paths 133, 135 allows the transmission 104 to achieve a fixed ratio.

Figure 6A:
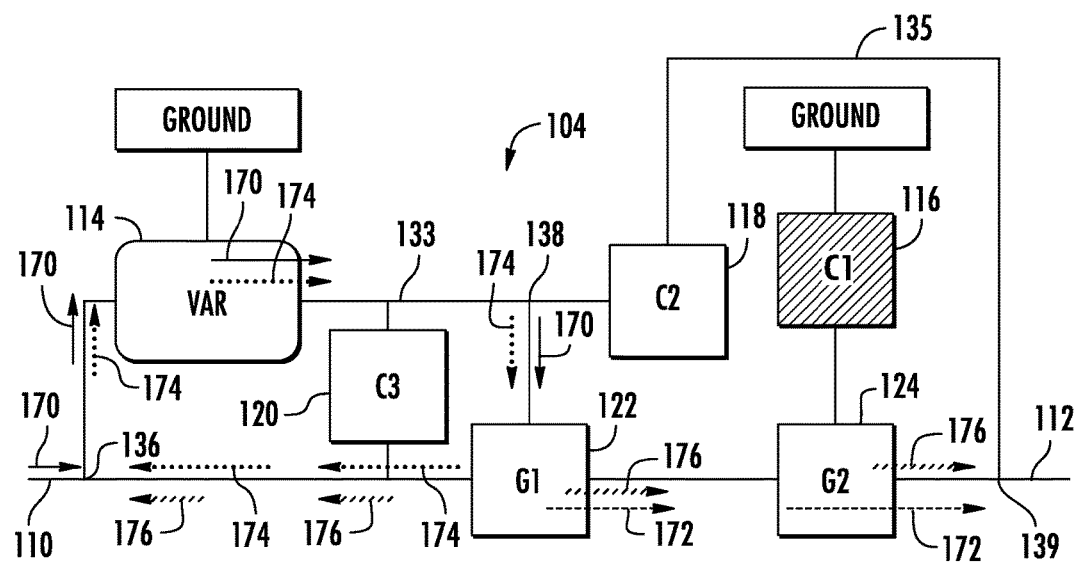
FIG. 6A is a block diagrammatic view of the infinitely variable transmission of FIG. 1 showing power flow therethrough in a first reverse operating mode.

In the illustrative embodiment, the power path 133 is defined by a junction 136, the first gearset 122, the second gearset 124, the first clutch 116, the variator 114, the first member 137, the second member 147, the variator bypass clutch 120, a junction 141, a junction 143, and a junction 139. The input side of the power path 133 is defined at the junction 136. The junction 136 may embodied as a coupling permitting power received by the input shaft 110 to be transmitted along the power path 133 and toward or away from the first gearset 122. The junction 136 also permits power received by the input shaft 110 to be transmitted toward or away from the variator 114 along the power path 133. Power may be transmitted along the power path 133 from the junction 136 to the first gearset 122, and power transmitted to the first gearset 122 may be transmitted thereafter to the second gearset 124 and recirculated toward the junction 136 along the power path 133 as shown in each of FIGS. 6B and 7A. Power may also be transmitted along the power path 133 from the junction 136 to the first gearset 122 through the variator 114, and power transmitted to the first gearset 122 through the variator 114 may be transmitted thereafter to the second gearset 124 and recirculated toward the junction 136 along the power path 133 as shown in FIG. 6A.

As illustrated in FIGS. 6A-8B, the first gearset 122 is a "mixing" planetary gearset that allows one portion of power transmitted thereto to be transmitted to the second gearset 124, and another portion of power transmitted thereto to be recirculated back toward the input shaft 110. Each component of the first gearset 122 (i.e., each of a sun gear, a carrier, a ring gear, and a plurality of planet gears included in the first gearset 122 as described in more detail below) rotates and is configured to transmit power (i.e., no component of the first gearset 122 is grounded).

The power path 133 utilizes at least one of a "fixed" and a "variable" sub-path to transmit power. Power transmitted along the "fixed" sub-path is transmitted at a fixed mechanical ratio. Conversely, power transmitted along the "variable" sub-path is transmitted over a continuously-variable ratio range, i.e., embodied as power transmitted through the variator 114. The "fixed" and "variable" sub-paths of the power path 133 are described in more detail below.

The "fixed" sub-path of the power path 133 corresponds to power flowing from the junction 136 to the first gearset 122 and therefrom to the junction 139 through the second gearset 124. The "variable" sub-path of the power path 133 may correspond to power flowing from the junction 136 to the first gearset 122 through the variator 114. Alternatively, the "variable" sub-path of the power path 133 may correspond to power flowing from the junction 136 to the variator 114 through the first gearset 122.

In the illustrative embodiment, the power path 135 is defined by a junction 138, the second clutch 118, and the junction 139. The power path 135 utilizes the power path 133 to transmit power from the input shaft 110 to the output shaft 112 as shown in FIGS. 7-8. The power path 135 is "direct" in that power transmitted along the power path 135 is not split or recirculated as shown in FIGS. 7B, 8A, and 8B.

Referring now to FIG. 4, the variator 114, the plurality of gearsets 121, and the plurality of clutches 115 of the transmission 104 are physically arranged between the input shaft 110 and the output shaft 112 of the transmission 104. In the illustrative physical arrangement of the transmission 104, the variator 114 is positioned in front of the plurality of clutches 115 and the plurality of gearsets 121 relative to the input shaft 110 as shown in FIG. 4.

Figure 6B:
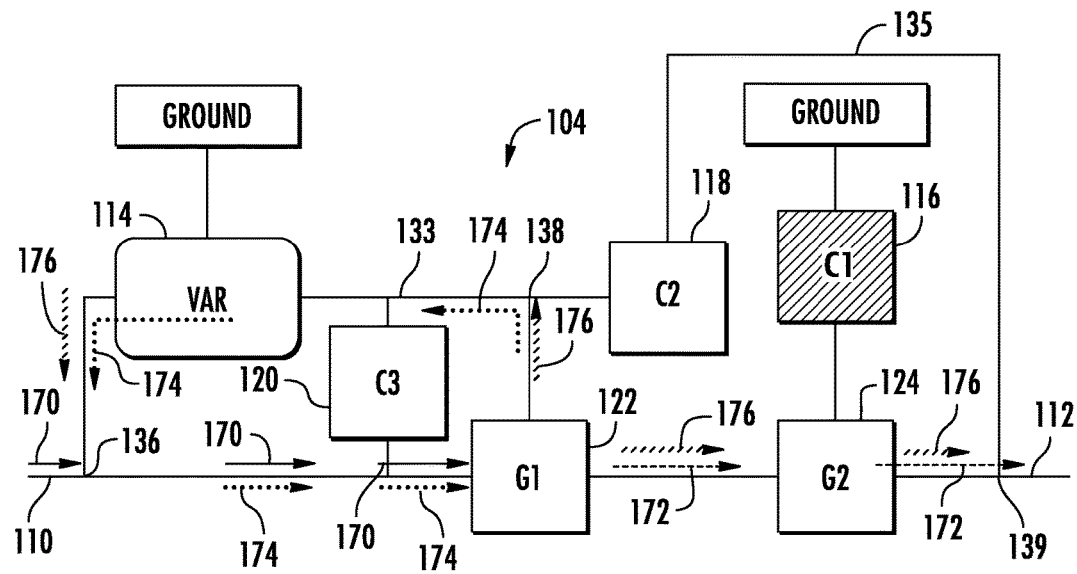
FIG. 6B is a block diagrammatic view of the infinitely variable transmission of FIG. 1 showing power flow therethrough in a first forward operating mode.

The first gearset 122 of the plurality of gearsets 121 is configured to receive power supplied by the input shaft 110 and transmitted to the junction 136 and thereafter to the first gearset 122 as shown, for example, in FIG. 6B. The first gearset 122 is illustratively a simple planetary gearset that includes the ring gear 140, a plurality of planet gears 142, the carrier 144, and a sun gear 146. Each of the planet gears 142 is intermeshed with the ring gear 140 and the sun gear 146, and each of the planet gears 142 is supported for rotation by the carrier 144. Power from the input shaft 110 is transmitted to the junction 136 and therefrom to the carrier 144. The sun gear 146 of the first gearset 122 is coupled to the second gearset 124, and the second clutch 118 is engageable to couple the member 147 to the output shaft 112 through the ring gear 140 and the second gearset 124. The ring gear 140 is coupled to the output ring 130 of the variator 114.

The second gearset 124 of the plurality of gearets 121 is configured to receive power supplied by the input shaft 110 and transmitted to the junction 136 and thereafter to the second gearset 124 as shown, for example, in FIG. 6B. The second gearset 124, similar to the first gearset 122, is illustratively a simple planetary gearset that includes a ring gear 148, a plurality of planet gears 150, a carrier 152, and a sun gear 154. Each of the planet gears 150 is intermeshed with the ring gear 148 and the sun gear 154, and each of the planet gears 150 is supported for rotation by the carrier 152. The first clutch 116 is engageable to couple the ring gear 148 to a stationary, non-rotating part of the transmission 104, thereby preventing the ring gear 148 from rotating (i.e., braking the ring gear 148). For instance, the first clutch 116 may be engaged to couple the ring gear 148 to the housing of the transmission 104. The sun gear 154 is coupled to the sun gear 146 of the first gearset 122. The second clutch 118 is engageable to couple the member 147 to the output shaft 112 through the ring gear 140 of the first gearset and the carrier 152. The carrier 152 is coupled to the output shaft 112 as shown in FIG. 4.

A power take-off device (not shown) may be coupled to the variator 114 to transmit power from the drive unit 102 to the variator 114 and therefrom to the power-take off device. More specifically, the power take-off device may be coupled to the output ring 130 of the variator 114 (the coupling of the input ring 126 of the variator 114 to the input shaft 110 as shown in FIG. 4 prevents the power take-off device from being coupled to the input ring 126). When the transmission 104 is placed in a neutral range, the variator 114 may be used to continuously vary the ratio of the power-take off device relative to the rotational speed of the drive unit output shaft 108 and the transmission input shaft 110.

Referring now to FIG. 5, a table 160 illustrates the various operating modes of the transmission 104, the clutches applied in each mode, and the transmission ratio(s) achieved in each mode. It should be appreciated that the transmission operating modes are the same in each of the first, second, third, and fourth embodiments of the present disclosure, and also that the transmission ratios achieved in each mode are the same across those embodiments. The transmission 104 is operable in two operating modes to achieve a variable transmission ratio within a defined transmission ratio range. In all other operating modes, as discussed below, the transmission 104 achieves a single transmission ratio.

The transmission 104 is operable in the "Mode 1" operating mode, when the first clutch 116 is engaged as shown in FIG. 5, to achieve a variable transmission ratio within the range of −0.250 (minimum) to 0.556 (maximum). As suggested above, the variable transmission ratio is achievable in "Mode 1" as a result of utilizing the variator 114. The "Mode 1" operating mode covers a reverse ratio range (i.e., a ratio from −0.250 to 0.000), and a forward ratio range (i.e., a ratio from 0.000 to 0.556) as shown in FIG. 5. As suggested above, the "Mode 1" operating mode permits the transition from the reverse range to the forward range and thereby provides the geared neutral mode in this respect.

The transmission 104 is operable in the "Bypass 1" operating mode, when the first clutch 116 and the variator bypass clutch 120 are contemporaneously engaged as shown in FIG. 5, to achieve a fixed transmission ratio of 0.268. Because the variator 114 is bypassed in the "Bypass 1" mode, only a single fixed transmission ratio is achieved by the transmission 104. The "Bypass 1" operating mode covers a forward ratio as shown in FIG. 5.

The transmission 104 is operable in the "Sync 1-2" operating mode, when the first clutch 116 and the second clutch 118 are contemporaneously engaged as shown in FIG. 5, to achieve a fixed transmission ratio of 0.556. The ratio of 0.556 coincides with the maximum ratio achieved in the "Mode 1" operating mode and the minimum ratio achieved in the "Mode 2" operating mode (discussed below) so that the "Sync 1-2" operating mode effects a transition (i.e., a synchronous shift) between those two modes. A single fixed transmission ratio is achieved by the transmission 104 in the "Sync 1-2" mode because the variator 114 is effectively bypassed. The "Sync 1-2" operating mode covers another forward ratio as shown in FIG. 5.

The transmission 104 is operable in the "Mode 2" operating mode, when the second clutch 118 is engaged as shown in FIG. 5, to achieve a variable transmission ratio within the range of 0.556 (minimum) to 1.800 (maximum). As suggested above, the variable transmission ratio is achievable in "Mode 2" as a result of utilizing the variator 114. The "Mode 2" operating mode covers another forward ratio range as shown in FIG. 5.

The transmission 104 is operable in the "Bypass 2" operating mode, when the second clutch 118 and the variator bypass clutch 120 are contemporaneously engaged as shown in FIG. 5, to achieve a fixed transmission ratio of 1.000. Because the variator 114 is bypassed in the "Bypass 2" mode, only a single fixed transmission ratio is achieved by the transmission 104. The "Bypass 2" operating mode covers another forward ratio as shown in FIG. 5.

Referring now to FIGS. 6-8, power flows through the transmission 104 for each of the operating modes discussed above are shown in greater detail. Beginning with the reverse ratio range of "Mode 1" of table 160, power flows from the input shaft 110 to the output shaft 112 of the transmission 104 as shown in FIG. 6A. As indicated above, the first clutch 116 is engaged in the "Mode 1" operating mode, and input power 170 (designated by the solid arrows) flows from the input shaft 110 to the junction 136 and thereafter to the junction 138 through the variator 114. Input power 170 flowing to the junction 138 is transmitted to the first gearset 122 where the input power 170 is modified by the "mixing" gearset 122 such that some of the power that is output from the first gearset 122 is transmitted to the second gearset 124 and some of the power is transmitted to the junction 136, as described in greater detail below.

As shown in FIG. 6A, the power transmitted from the first gearset 122 to the second gearset 124 has been designated input power 172 (shown in dashed). Input power 172 is transmitted from the second gearset 124 to the junction 139 and through the junction 139 to the output shaft 112. In that way, power received from the drive unit 102 via the input shaft 110 is transmitted to the output shaft 112 in the reverse ratio range covered by the "Mode 1" operating mode.

Recirculated power 174 (designated by the dotted arrows) is transmitted from the first gearset 122 back to the junction 136. At the junction 136, recirculated power 174 is combined with input power 170 received from the input shaft 110. Recirculated power 174 then flows in parallel with input power 170 from the junction 136 through the variator 114 to the first gearset 122 in identical fashion to input power 170. Hereafter, the combination of input power 170 and recirculated power 174 is referred to as "combined power" and is understood to be greater than input power 170 and recirculated power 174.

The "mixing" gearset 122 breaks up the combined power into split power 176 (designated by the slashed arrows), which is transmitted to the gearset 124 and back to the junction 136, as shown in FIG. 6A. In this way, some split power 176 flows from the first gearset 122 to the output shaft 112 through the second gearset 124 (like input power 172), thereby adding to the power transmitted to the output shaft 112. Some split power 176 also flows from the first gearset 122 to the junction 136 and, like recirculated power 174, back through the variator 114 to the first gearset 122 in parallel with input power 170.

Turning to the forward ratio range of "Mode 1," power flows from the input shaft 110 to the output shaft 112 of the transmission 104 as shown in FIG. 6B. Input power 170 flows from the input shaft 110 to the junction 136 and therefrom to the first gearset 122 as shown in FIG. 6B. Input power 170 reaching the first gearset 122 is modified by the "mixing" gearset 122 such that some of the power that is output from the first gearset 122 is transmitted to the second gearset 124 and some of the power is transmitted to the junction 136, as described in greater detail below.

As shown in FIG. 6B, the power transmitted from the first gearset 122 to the second gearset 124 has been designated input power 172 (shown in dashed). Input power 172 is transmitted from the second gearset 124 to the junction 139 and through the junction 139 to the output shaft 112 as shown in FIG. 6B. In that way, power received from the drive unit 102 via the input shaft 110 is transmitted to the output shaft 112 in the forward ratio range covered by the "Mode 1" operating mode.

Recirculated power 174 (designated by the dotted arrows) is transmitted from the first gearset 122 back to the junction 136 through the variator 114 and the junction 138 as shown in FIG. 6B. At the junction 136, recirculated power 174 is combined with input power 170 received from the input shaft 110. Recirculated power 174 then flows in parallel with input power 170 from the junction 136 to the first gearset 122 in identical fashion to input power 170. Hereafter, the combination of input power 170 and recirculated power 174 is referred to as "combined power" and is understood to be greater than input power 170 and recirculated power 174.

The "mixing" gearset 122 breaks up the combined power into split power 176 (designated by the slashed arrows), which is transmitted to the gearset 124 and back to the junction 136, as shown in FIG. 6B. In this way, some split power 176 flows from the first gearset 122 to the output shaft 112 through the second gearset 124 (like input power 172), thereby adding to the power transmitted to the output shaft 112. Some split power 176 also flows from the first gearset 122 to the junction 136 through the junction 138 and the variator 114 and, like recirculated power 174, back to the first gearset 122 in parallel with input power 170.

Figure 7A:
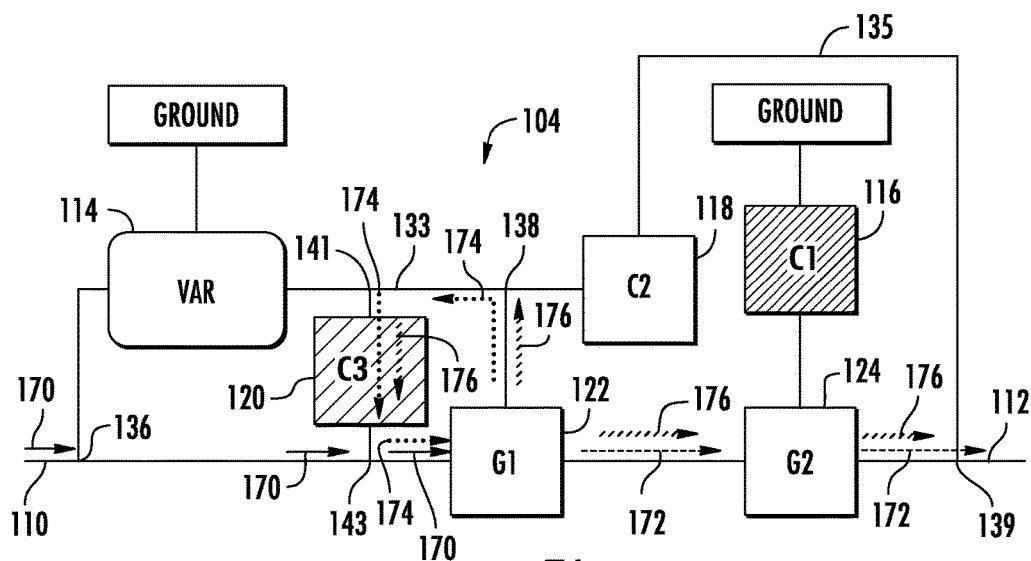
FIG. 7A is a block diagrammatic view of the infinitely variable transmission of FIG. 1 showing power flow therethrough in a first variator bypass operating mode.
Figure 7B:
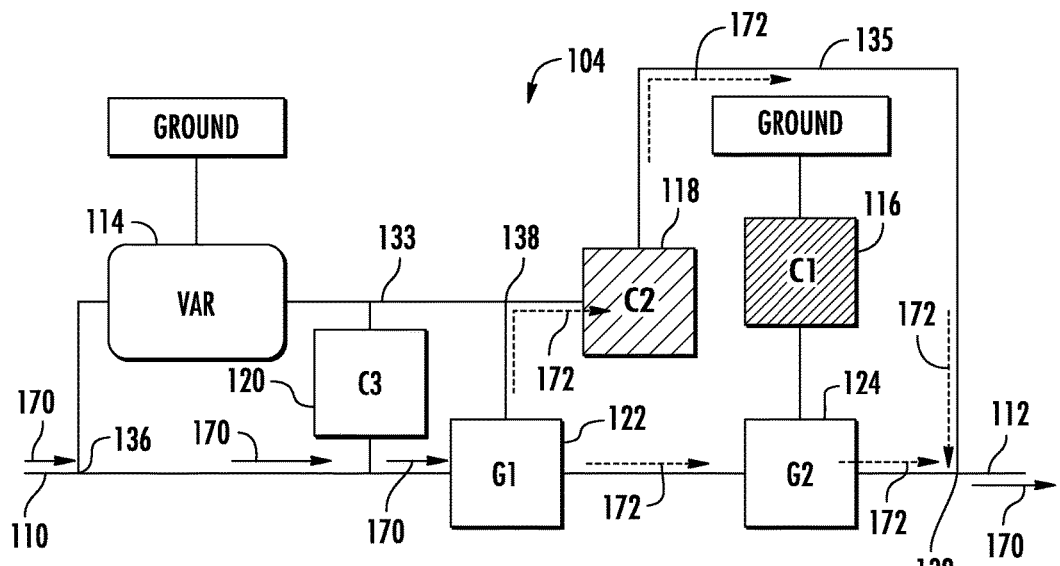
FIG. 7B is a block diagrammatic view of the infinitely variable transmission of FIG. 1 showing power flow therethrough in a first synchronous operating mode.
Figure 8A:
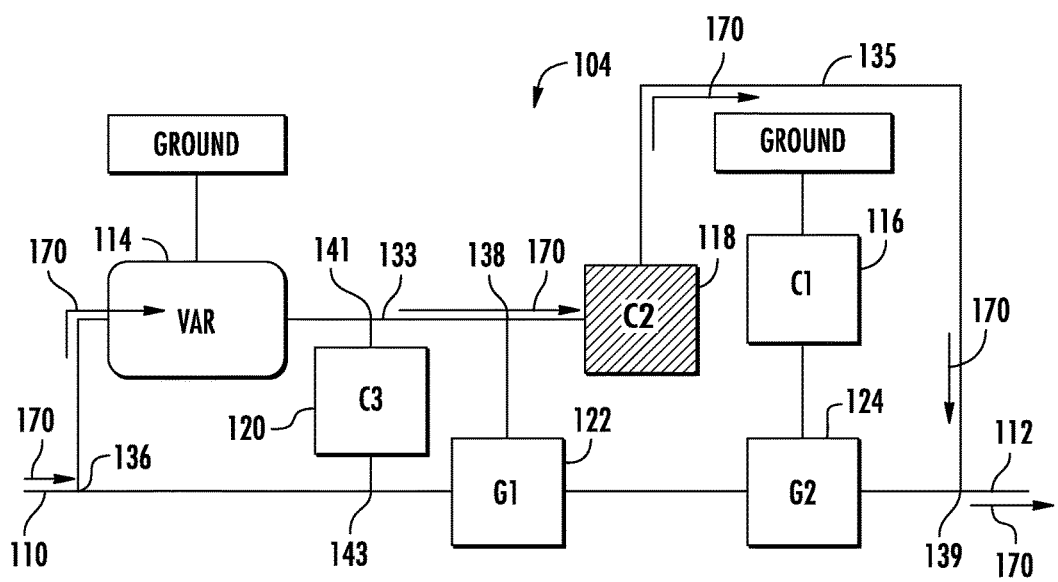
FIG. 8A is a block diagrammatic view of the infinitely variable transmission of FIG. 1 showing power flow therethrough in a second forward operating mode.
Figure 8B:
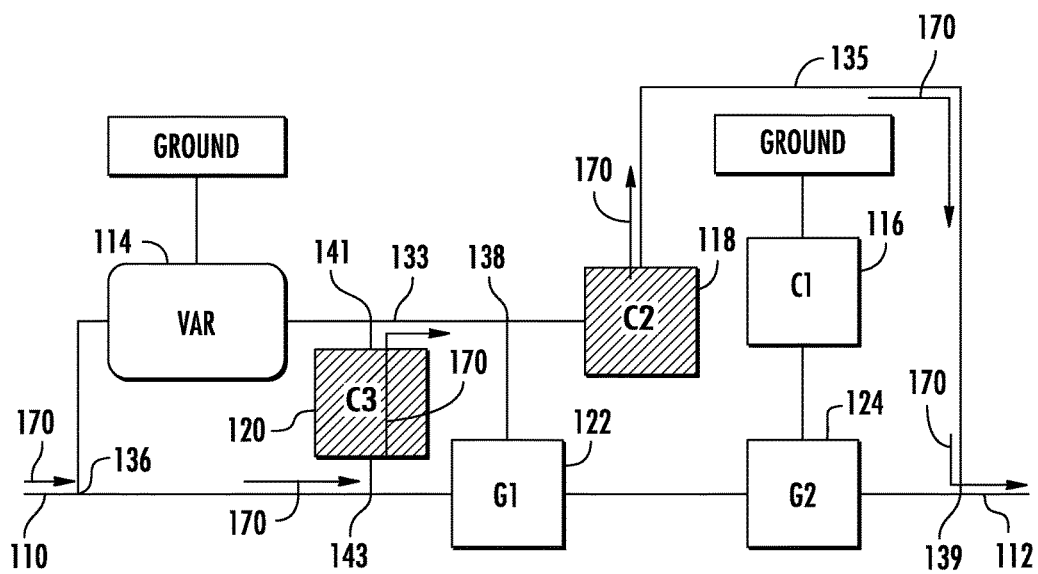
FIG. 8B is a block diagrammatic view of the infinitely variable transmission of FIG. 1 showing power flow therethrough in a second variator bypass operating mode.

Turning now to the "Bypass 1" operating mode of table 160, power flows from the input shaft 110 to the output shaft 112 as shown in FIG. 7A. Input power 170 flows from the input shaft 110 to the junction 136 and thereafter to the first gearset 122 through a junction 143. Input power 170 reaching the first gearset 122 is modified by the "mixing" gearset 122 such that some of the power that is output from the first gearset 122 is transmitted to the second gearset 124 and some of the power is transmitted to the junction 143, as described in detail below.

As shown in FIG. 7A, the power transmitted from the first gearset 122 to the second gearset 124 has been designated input power 172 (shown in dashed). Input power 172 is transmitted from the second gearset 124 to the junction 139 and through the junction 139 to the output shaft 112 as shown in FIG. 7A. In that way, power received from the drive unit 102 via the input shaft 110 is transmitted to the output shaft 112 in the "Bypass 1" operating mode.

Recirculated power 174 (designated by the dotted arrows) is transmitted from the first gearset 122 back to the junction 143 through the junction 138 and the variator bypass clutch 120 as shown in FIG. 7A. At the junction 143, recirculated power 174 is combined with input power 170 received from the input shaft 110. Recirculated power 174 then flows in parallel with input power 170 from the junction 143 to the first gearset 122 in identical fashion to input power 170. Hereafter, the combination of input power 170 and recirculated power 174 is referred to as "combined power" and is understood to be greater than input power 170 and recirculated power 174.

The "mixing" gearset 122 breaks up the combined power into split power 176 (designated by the slashed arrows), which is transmitted to the gearset 124 and back to the junction 143, as shown in FIG. 7A. In this way, some split power 176 flows from the first gearset 122 to the output shaft 112 through the second gearset 124 (like input power 172), thereby adding to the power transmitted to the output shaft 112. Some split power 176 also flows from the first gearset 122 to the junction 143 through the junction 138 and the variator bypass clutch 120 and, like recirculated power 174, back to the first gearset 122 in parallel with input power 170.

Turning now to the "Sync 1-2" operating mode of table 160, power flows from the input shaft 110 to the output shaft 112 as shown in FIG. 7B. Input power 170 flows from the input shaft 110 to the junction 136 and thereafter to the first gearset 122. Input power 170 reaching the first gearset 122 is modified by the "mixing" gearset 122 such that some of the power that is output from the first gearset 122 is transmitted to the second gearset 124 and some of the power is transmitted to the second clutch 118, as described in detail below.

As shown in FIG. 7B, the power transmitted from the first gearset 122 to the second gearset 124 is designated input power 172 (shown in dashed). In addition, the power transmitted from the first gearset 122 to the second clutch 118 is designated input power 172. Input power 172 flows from the second gearset 124 to the junction 139 and also from the second clutch 118 to the junction 139. As such, input power 170 is reconstituted at the junction 139, and input power 170 reconstituted at the junction 139 flows to the output shaft 112 as shown in FIG. 7B. In that way, power received from the drive unit 102 via the input shaft 110 is transmitted to the output shaft 112 in the "Sync 1-2" operating mode.

Turning now to the "Mode 2" operating mode of table 160, power flows from the input shaft 110 to the output shaft 112 as shown in FIG. 8A. Input power 170 flows from the input shaft 110 to the junction 136 and thereafter to the junction 138 through the variator 114 and the junction 141. Input power 170 reaching the junction 138 is transmitted to the junction 139 through the second clutch 118, and input power 170 reaching the junction 139 is transmitted to the output shaft 112 as shown in FIG. 8A.

Turning now to the "Bypass 2" operating mode of table 160, power flows from the input shaft 110 to the output shaft 112 as shown in FIG. 8B. Input power 170 flows from the input shaft 110 to the junction 136 and thereafter to the junction 141 through the junction 143 and the variator bypass clutch 120. Input power 170 reaching the junction 141 is transmitted to the junction 139 through the junction 138 and the second clutch 118, and input power 170 reaching the junction 139 is transmitted to the output shaft 112 as shown in FIG. 8B.

Figure 9:
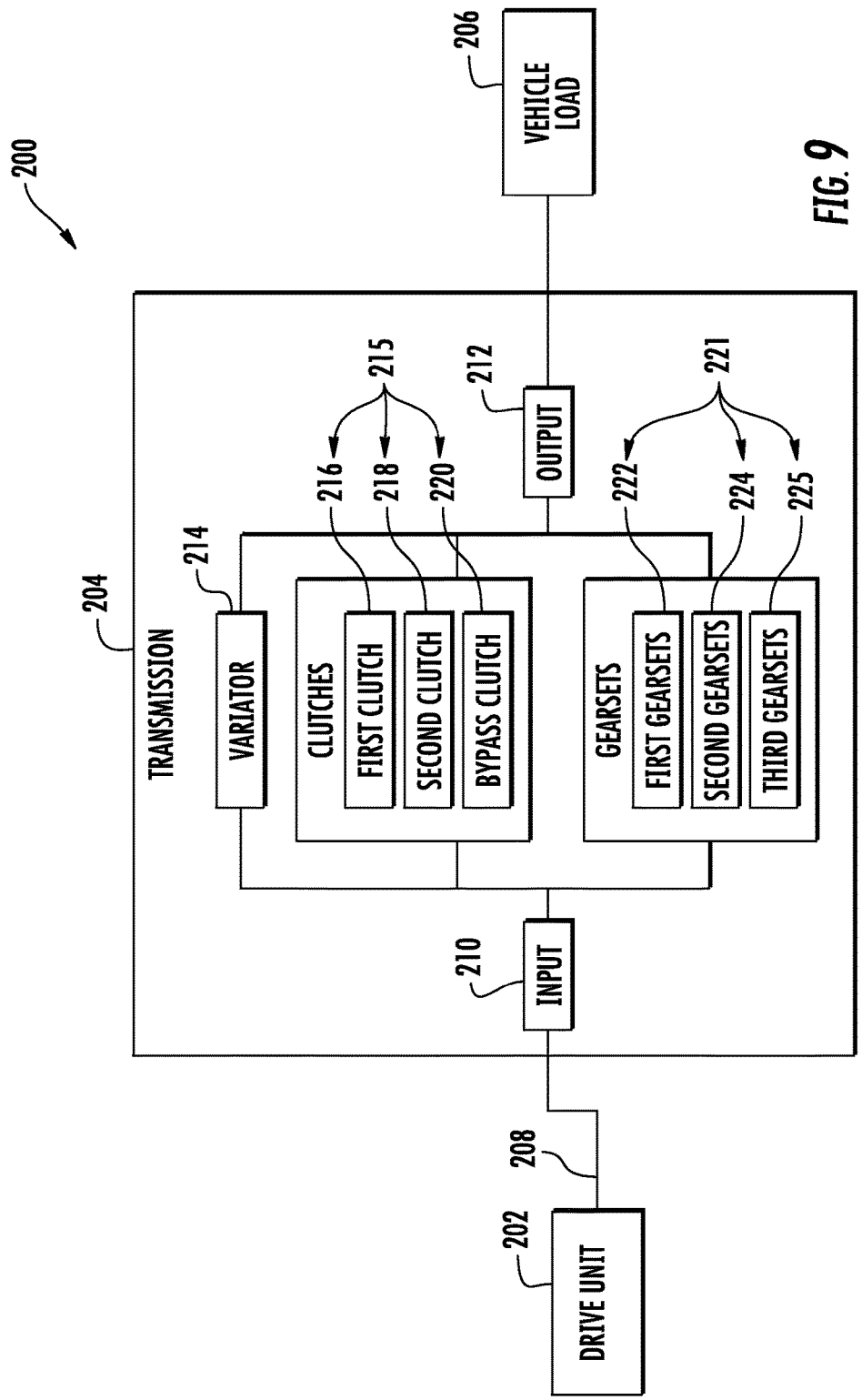
FIG. 9 is a simplified block diagram of an infinitely variable transmission including a variator in a second embodiment of the disclosure.

Referring now to FIG. 9, an illustrative motor vehicle 200 includes a drive unit 202, a transmission 204 coupled to the drive unit 202, and a vehicle load 206 coupled to the transmission 204 in a second embodiment of the present disclosure. The drive unit 202 includes an output shaft 208 that is coupled to an input shaft 210 of the transmission 204. The transmission 204 includes an output shaft 212 that is coupled to the vehicle load 206. The drive unit 202, similar to the drive unit 102, may be embodied as any type of motor or internal combustion engine having a reciprocating or a rotary configuration that provides rotational power to the transmission 204 and therethrough to the vehicle load 206. The vehicle load 206, similar to the vehicle load 106, may be embodied as, or otherwise include, drive wheels, caterpillar tracks, propels, etc. that impart the motor vehicle 200 with locomotion when driven by the drive unit 202 via the transmission 204. Additionally, the vehicle load 206 may be an embodied as an auxiliary gearbox (e.g. a transfer case or drop box) or a power take-off device, such as a pump, mixer, lifter, shoveler, compressor, compactor, or blower.

The transmission 204 is operable in a plurality of operating modes to transmit rotational power supplied by the drive unit 202 from the transmission input shaft 210 to the transmission output shaft 212. Each operating mode enables at least one ratio of input speed to output speed to be achieved. As discussed below, operating modes of the transmission 204 in which a variator 214 is utilized enable a range of transmission ratios to be achieved whereas operating modes in which the variator 214 is not utilized enable only a single transmission ratio to be achieved.

The transmission 204 of FIG. 9 is illustratively embodied as an infinitely variable transmission. The transmission 204 includes the variator 214, a plurality of clutches 215, and a plurality of gearsets 221 in addition to the input shaft 210 and the output shaft 212. The plurality of clutches 215 includes a first clutch 216, a second clutch 218, and a variator bypass clutch 220. The plurality of gearsets 221 includes a first gearset 222, a second gearset 224, and a third gearset 225.

The variator 214, the plurality of clutches 215, and the plurality of gearsets 221 included in the transmission 204 are arranged between the input shaft 210 and the output shaft 212 of the transmission 204. Each of the gearsets included in the plurality of gearsets 221 may be supported by a mainshaft of the transmission 204 and may be capable of rotating freely and independently thereof. Each of the clutches may be selectively engaged to transmit power along a particular path between components included in the transmission 204 as discussed below.

The variator bypass clutch 220, as discussed below, is engageable to lock a variator input ring 226 to a variator output ring 230 so that the variator 214 achieves a 1:1 ratio. When the variator bypass clutch 220 is engaged, the power load experienced by the variator 214 is removed, and all the power transmitted to the variator 214 flows instead through the variator bypass clutch 220. The variator bypass clutch 220 is similar to the variator bypass clutch 120, and the variator 214 is illustratively embodied as a planetary-type ball variator similar to the variator 114.

Figure 10A:
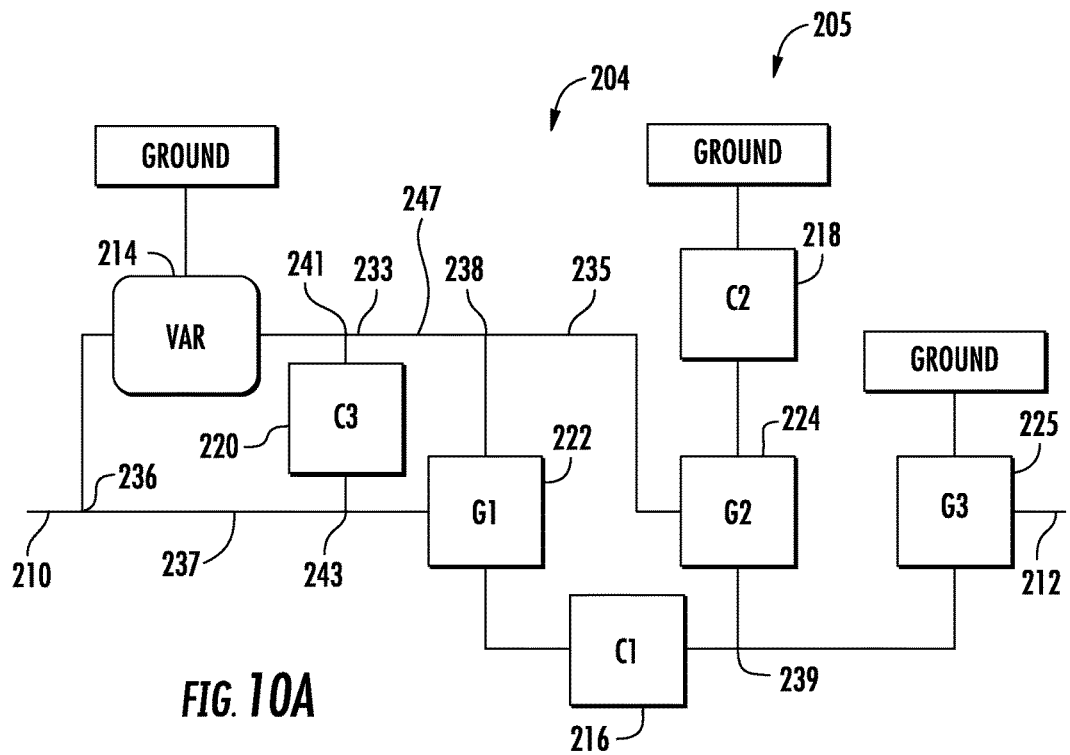
FIG. 10A is a block diagrammatic view of the architecture of the infinitely variable transmission of FIG. 9 showing various components included in the infinitely variable transmission arranged in a first configuration.

Referring now to FIG. 10A, the architecture of the transmission 204 is shown in a first configuration 205 in the second embodiment of the disclosure. Each of the gearsets of the plurality of gearsets 221 is represented by a corresponding box (i.e. G1, G2, and G3) and the variator 214 is designated as "VAR." G1 designates the first gearset 222, G2 designates the second gearset 224, and G3 designates the third gearset 225. The clutches are also each represented by a box such that the following designations apply: C1 (the first clutch 216), C2 (the second clutch 218), and C3 (the variator bypass clutch 220).

In the illustrative embodiment, the architecture of the transmission 204 defines a plurality of power paths along which power is transmitted between components included in the transmission 204. The plurality of power paths includes a power path 233 and a power path 235. As illustrated in FIGS. 13A-15B, power flow along the power path 233 is bi-directional in the plurality of operating modes of the transmission 204, and power flow along the power path 235 is uni-directional in the plurality of operating modes of the transmission 204. In each operating mode of the transmission 204, power is transmitted between the input shaft 210 and the output shaft 212 along at least one of the power path 233 and the power path 235. As indicated below, contemporaneous power flow from the input shaft 210 to the output shaft 212 along more than one of the power paths 233, 235 allows the transmission 204 to achieve a fixed ratio.

Figure 13A:
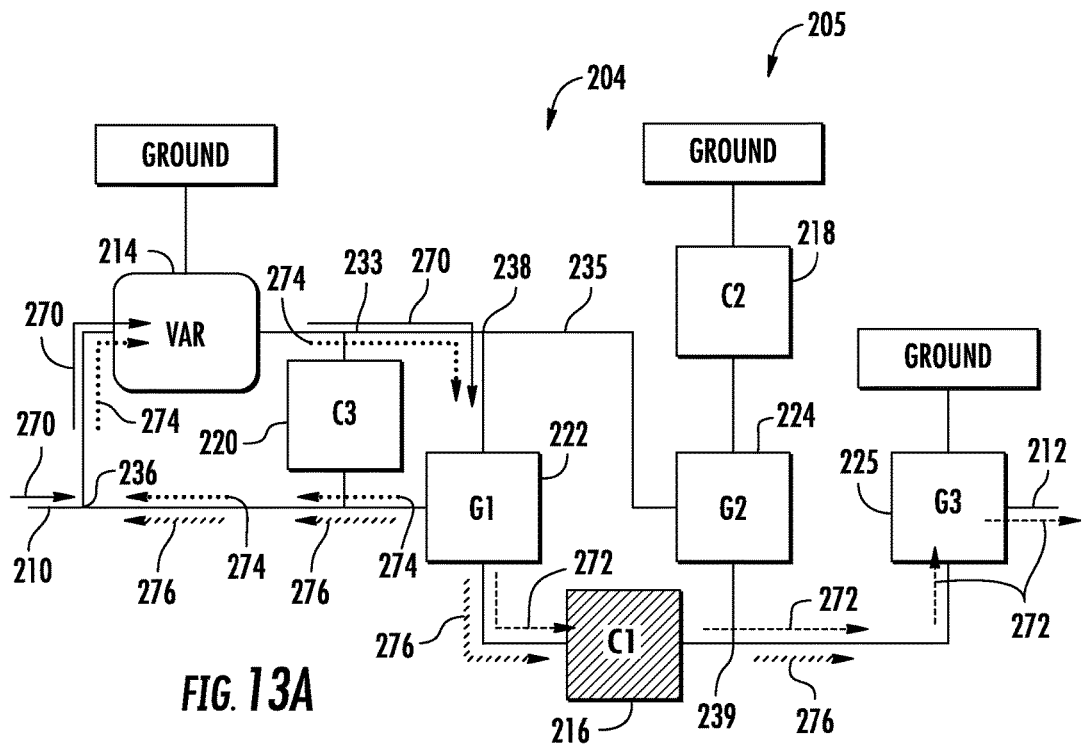
FIG. 13A is a block diagrammatic view of the infinitely variable transmission of FIG. 10A showing power flow therethrough in a first reverse operating mode.
Figure 13B:
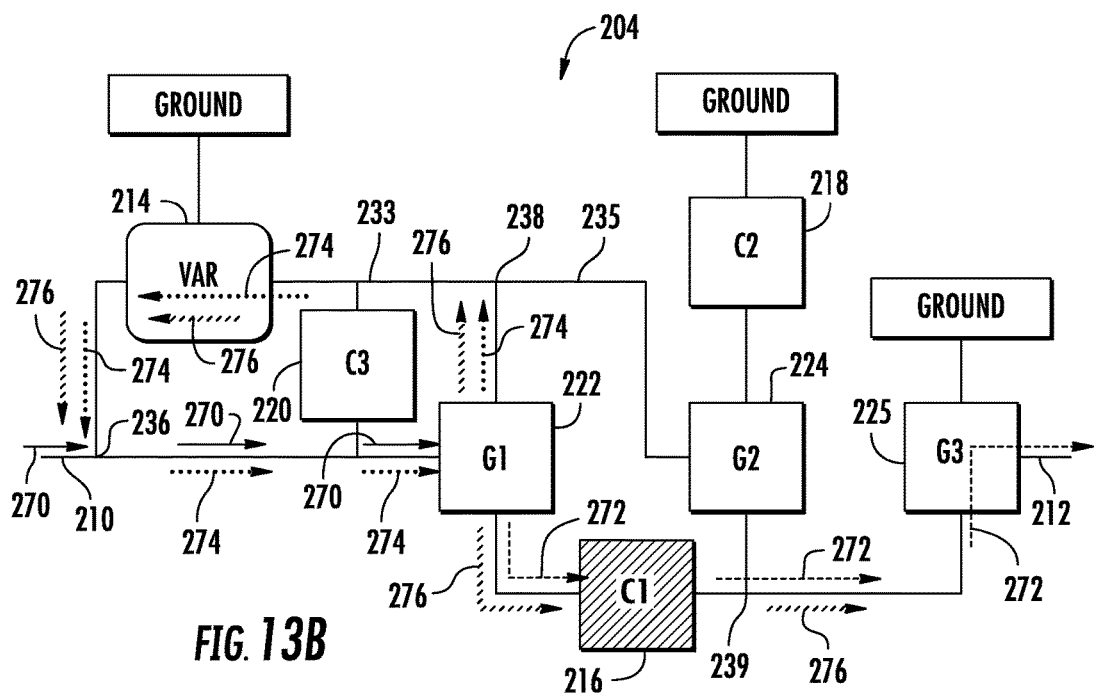
FIG. 13B is a block diagrammatic view of the infinitely variable transmission of FIG. 10A showing power flow therethrough in a first forward operating mode.

The power path 233 is illustratively defined by the junction 236, the first gearset 222, the third gearset 225, the first clutch 216, the variator 214, the variator bypass clutch 220, a junction 243, a junction 241, and the junction 239. The input side of the power path 233 is defined at the junction 236. The junction 236 may be embodied as a coupling permitting power received by the input shaft 210 to be transmitted along the power path 233 and toward or away from the first gearset 222. The junction 236 also permits power received by the input shaft 210 to be transmitted toward or away from the variator 214 along the power path 233. Power may be transmitted along the power path 233 from the junction 236 to the first gearset 222, and power transmitted to the first gearset 222 may be transmitted thereafter to the third gearset 225 and recirculated toward the junction 236 along the power path 233 as shown in FIG. 13B. Power may also be transmitted along the power path 233 from the junction 236 to the first gearset 222 through the variator 214, and power transmitted to the first gearset 222 through the variator 214 may be transmitted thereafter to the third gearset 225 and recirculated toward the junction 236 along the power path 233 as shown in FIG. 13A.

As illustrated in FIGS. 13A-15B, the first gearset 222 is a "mixing" planetary gearset that allows one portion of power transmitted thereto to be transmitted to the third gearset 225, and another portion of power transmitted thereto to be recirculated toward the input shaft 210. Each component of the first gearset 222 (i.e., each of a sun gear, a carrier, a ring gear, and a plurality of planet gears included in the first gearset 222 as described in more detail below) rotates and is configured to transmit power (i.e., no component of the first gearset 222 is grounded).

The power path 233 utilizes at least one of a "fixed" and a "variable" sub-path to transmit power. Power transmitted along the "fixed" sub-path is transmitted at a fixed mechanical ratio. Conversely, power transmitted along the "variable" sub-path is transmitted over a continuously-variable ratio range, i.e., embodied as power that is transmitted through the variator 214. The "fixed" and "variable" sub-paths of the power path 233 are described in more detail below.

The "fixed" sub-path of the power path 233 corresponds to power flowing from the junction 236 to the first gearset 222 and from the first gearset 222 to the junction 239 through the third gearset 225. The "variable" sub-path of the power path 233 may correspond to flowing from the junction 236 to the first gearset 222 through the variator 214. Alternatively, the "variable" sub-path of the power path 233 may correspond to power flowing from the junction 236 to the variator 214 through the first gearset 222.

The power path 235 is illustratively defined by a junction 238, the second clutch 218, the second gearset 224, and the junction 239. The power path 235 utilizes the power path 233 to transmit power from the input shaft 210 to the output shaft 212 as shown in FIGS. 14A-15B. The power path 235 is "direct" in that power transmitted along the power path 235 is not split or recirculated as shown in FIGS. 14B-15B.

Figure 10B:
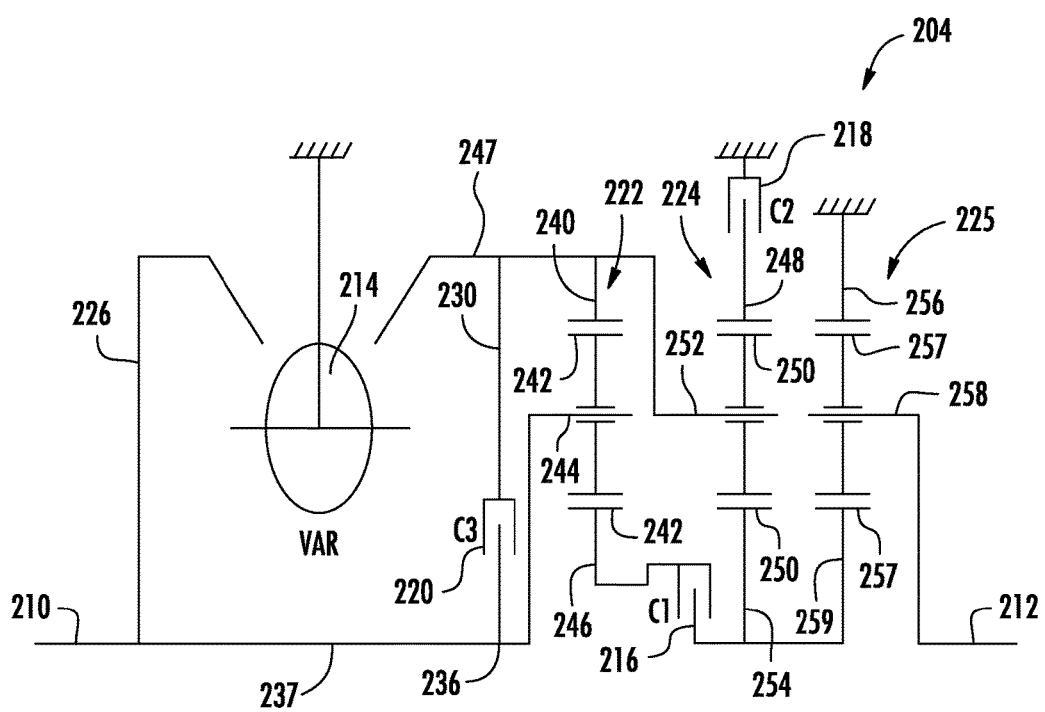
FIG. 10B is a schematic of the architecture of the infinitely variable transmission of FIG. 10A and the associated transmission components.

Referring now to FIG. 10B, the variator 214, the plurality of gearsets 221, and the plurality of clutches 215 are physically arranged between the input shaft 210 and the output shaft 212 of the transmission 204 in the second configuration 205. In the illustrative physical arrangement of the transmission 204, the variator 214 is positioned in front of the plurality of clutches 215 and the plurality of gearsets 221 relative to the input shaft 210 as shown in FIG. 10B.

The first gearset 222 of the plurality of gearsets 221 is configured to receive power from the input shaft 210 that is transmitted to the junction 236 and thereafter to the first gearset 222 as shown in FIG. 10B. The first gearset 222 is illustratively a simple planetary gearset that includes a ring gear 240, a plurality of planet gears 242, a carrier 244, and a sun gear 246. Each of the planet gears 242 is intermeshed with the ring gear 240 and the sun gear 246, and each of the planet gears 242 is supported for rotation by the carrier 244. Power from the input shaft 210 is transmitted to the junction 236 and therefrom to the carrier 244. The first clutch 216 is engageable to couple the sun gear 246 to the second gearset 224 as shown in FIG. 10B. The ring gear 240 is coupled to the second gearset 224 as shown in FIG. 10B. The ring gear 240 is coupled to the output ring 230 of the variator 214.

The second gearset 224 of the plurality of gearsets 221 is configured to receive power from the input shaft 210 that is transmitted to the junction 236 and thereafter to the second gearset 224 as shown in FIG. 10B. The second gearset 224, similar to the first gearset 222, is illustratively a simple planetary gearset that includes a ring gear 248, a plurality of planet gears 250, a carrier 252, and a sun gear 254. Each of the planet gears 250 is intermeshed with the ring gear 248 and the sun gear 254, and each of the planet gears 250 is supported for rotation by the carrier 252. The first clutch 216 is engageable to couple the sun gear 254 to the sun gear 246 of the first gearset 222. The carrier 252 is coupled to the ring gear 240 of the first gearset 222. The second clutch 118 is engageable to couple the ring gear 248 to a stationary, non-rotating part of the transmission 204, thereby preventing the ring gear 248 from rotating (i.e., braking the ring gear 248). For instance, the second clutch 218 may be engaged to couple the ring gear 248 to the housing of the transmission 204. As such, the second clutch 218 is a non-rotating, stationary clutch.

The third gearset 225 of the plurality of gearsets 221 is configured to receive power from the input shaft 210 that is transmitted to the junction 236 and thereafter to the third gearset 225 as shown in FIG. 10B. The third gearset 225, similar to each of the first and second gearsets 222, 224, is illustratively a simple planetary gearset that includes a ring gear 256, a plurality of planet gears 257, a carrier 258, and a sun gear 259. Each of the planet gears 257 is intermeshed with the ring gear 256 and the sun gear 259, and each of the planet gears 257 is supported for rotation by the carrier 258. The carrier 258 is coupled to the output shaft 212, and the sun gear 259 is coupled to the sun gear 254 of the second gearset 224. The ring gear 256 is coupled to a stationary, non-rotating part of the transmission 204, such as the housing of the transmission 204.

A power take-off device (not shown) may be coupled to the variator 214 to transmit power from the drive unit 202 to the variator 214 and therefrom to the power-take off device. More specifically, the power take-off device may be coupled to the output ring 230 of the variator 214 (the coupling of the input ring 226 of the variator 214 to the input shaft 210 as shown in FIG. 10B prevents the power take-off device from being coupled to the input ring 226). When the transmission 204 is placed in a neutral range, the variator 214 may be used to continuously vary the ratio of the power-take off device relative to the rotational speed of the drive unit output shaft 208 and the transmission input shaft 210.

Figure 11A:
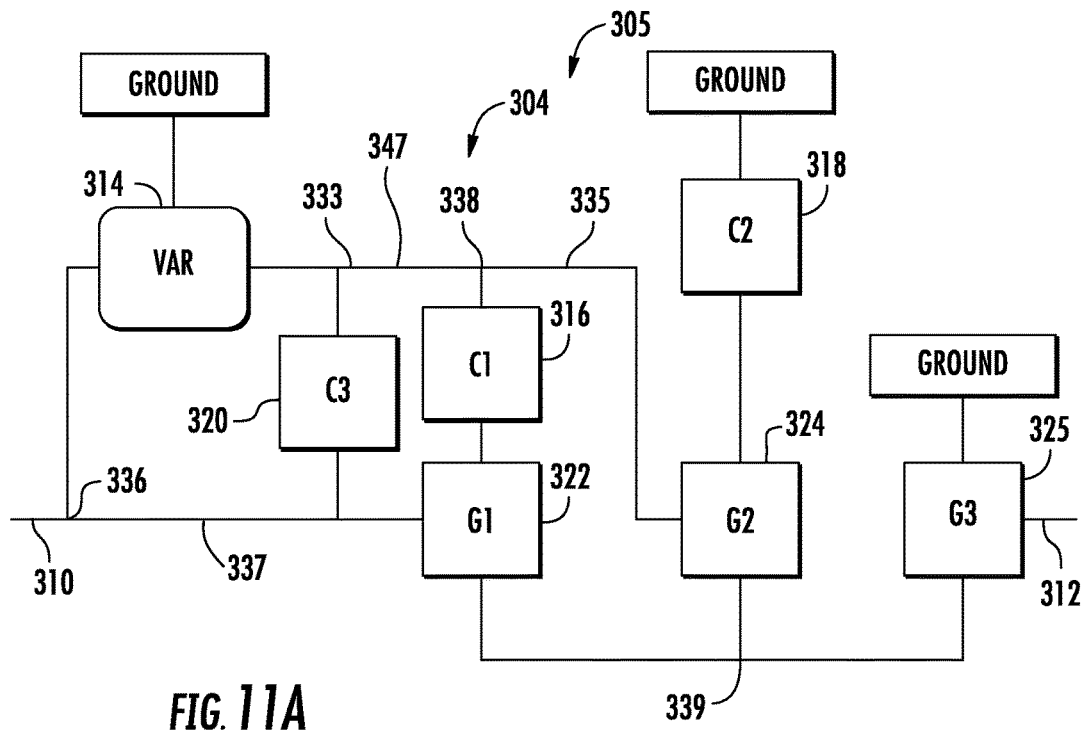
FIG. 11A is a block diagrammatic view of the architecture of the infinitely variable transmission of FIG. 9 showing the various components included in the infinitely variable transmission arranged in a second configuration in a third embodiment of the disclosure.
Figure 11B:
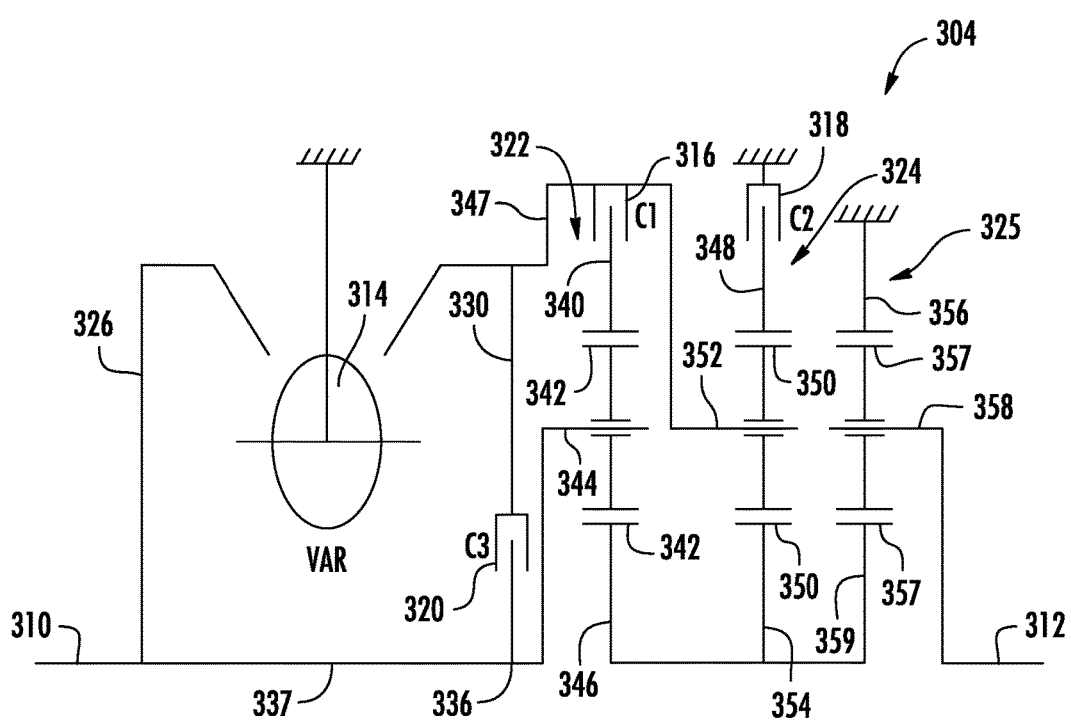
FIG. 11B is a schematic of the architecture of the infinitely variable transmission of FIG. 11A and the associated transmission components.

Referring now to FIG. 11A, the architecture of the transmission of FIG. 9 is shown in a second configuration 305 in the third embodiment of the disclosure. For the purposes of clarity, the transmission of the third embodiment is designated as the "transmission 304." The components of the transmission 304 (i.e., the clutches, gearsets, and the variator) as shown in FIGS. 11A-11B are identical to the components of the transmission 204 as shown in FIGS. 10A-10B. As such, each component of the transmission 304 having a "300" series label corresponds to the component of the transmission 204 having a "200" series label. For example, the variator 314 of the transmission 304 corresponds to the variator 214 of the transmission 204. Given those similarities, it should be appreciated that the transmission 304 may be substituted for the transmission 204 in the motor vehicle 200 shown in FIG. 9. In addition, the power paths defined by the architecture of the transmission 304 are identical to the power paths defined by the architecture of the transmission 204 (i.e., the power paths 333, 335 of the transmission 304 are identical to the power paths 233, 235 of the transmission 204).

Referring now to FIG. 11B, the variator 314, the plurality of gearsets 321, and the plurality of clutches 315 are physically arranged between the input shaft 310 and the output shaft 312 of the transmission 304. In the illustrative physical arrangement of the transmission 304, the variator 314 is positioned in front of the plurality of clutches 315 and the plurality of gearsets 321 relative to the input shaft 310 as shown in FIG. 11B.

The first gearset 322 of the plurality of gearsets 321 is configured to receive power from the input shaft 310 that is transmitted to the junction 336 and thereafter to the first gearset 322 as shown in FIG. 11B. The first gearset 322 is illustratively a simple planetary gearset that includes a ring gear 340, a plurality of planet gears 342, a carrier 344, and a sun gear 346. Each of the planet gears 342 is intermeshed with the ring gear 340 and the sun gear 346, and each of the planet gears 342 is supported for rotation by the carrier 344. Power from the input shaft 310 is transmitted to the junction 336 and therefrom to the carrier 344. The first clutch 316 is engageable to couple the ring gear 340 to the second gearset 324 and also to the output ring 330 of the variator 314 as shown in FIG. 11B. The sun gear 346 is coupled to the second gearset 324 as shown in FIG. 11B.

The second gearset 324 of the plurality of gearsets 321 is configured to receive power from the input shaft 310 that is transmitted to the junction 336 and thereafter to the second gearset 324 as shown in FIG. 11B. The second gearset 324 is illustratively a simple planetary gearset that includes a ring gear 348, a plurality of planet gears 350, a carrier 352, and a sun gear 354. Each of the planet gears 350 is intermeshed with the ring gear 348 and the sun gear 354, and each of the planet gears 350 is supported for rotation by the carrier 352. The first clutch 316 is engageable to couple the carrier 352 to the ring gear 340 of the first gearset 322. The sun gear 354 is coupled to the sun gear 346 of the first gearset 322 and also to the third gearset 325. The second clutch 318 is engageable to couple the ring gear 348 to a stationary, non-rotating part of the transmission 304, thereby preventing the ring gear 348 from rotating (i.e. braking the ring gear 348). For instance, the second clutch 318 may be engaged to couple the ring gear 348 to the housing of the transmission 304. As such, the second clutch 318 is a non-rotating, stationary clutch.

The third gearset 325 of the plurality of gearsets 321 is configured to receive power from the input shaft 310 that is transmitted to the junction 336 and thereafter to the third gearset 325 as shown in FIG. 11B. The third gearset 325 is illustratively a simple planetary gearset that includes a ring gear 356, a plurality of planet gears 357, a carrier 358, and a sun gear 359. Each of the planet gears 357 is intermeshed with the ring gear 356 and the sun gear 359, and each of the planet gears 357 is supported for rotation by the carrier 358. The carrier 358 is coupled to the output shaft 312, and the sun gear 359 is coupled to the sun gear 354 of the second gearset 324. The ring gear 356 is coupled to a stationary, non-rotating part of the transmission 304, such as the housing of the transmission 304.

Figure 12A:
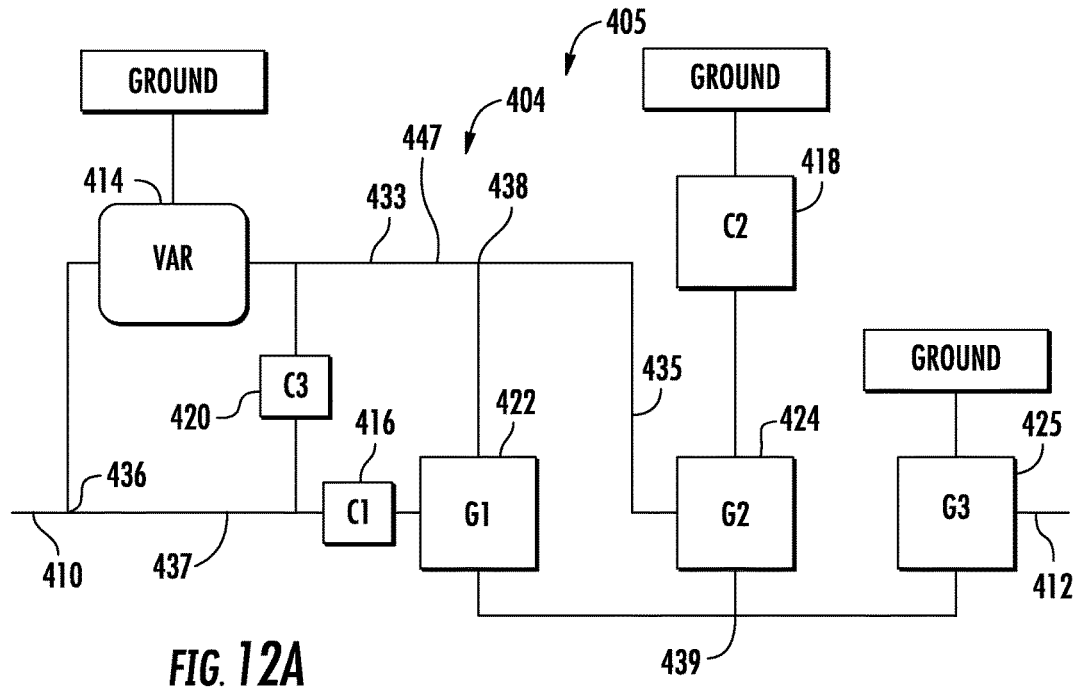
FIG. 12A is a block diagrammatic view of the architecture of the infinitely variable transmission of FIG. 9 showing the various components included in the infinitely variable transmission arranged in a third configuration in a fourth embodiment of the disclosure.
Figure 12B:
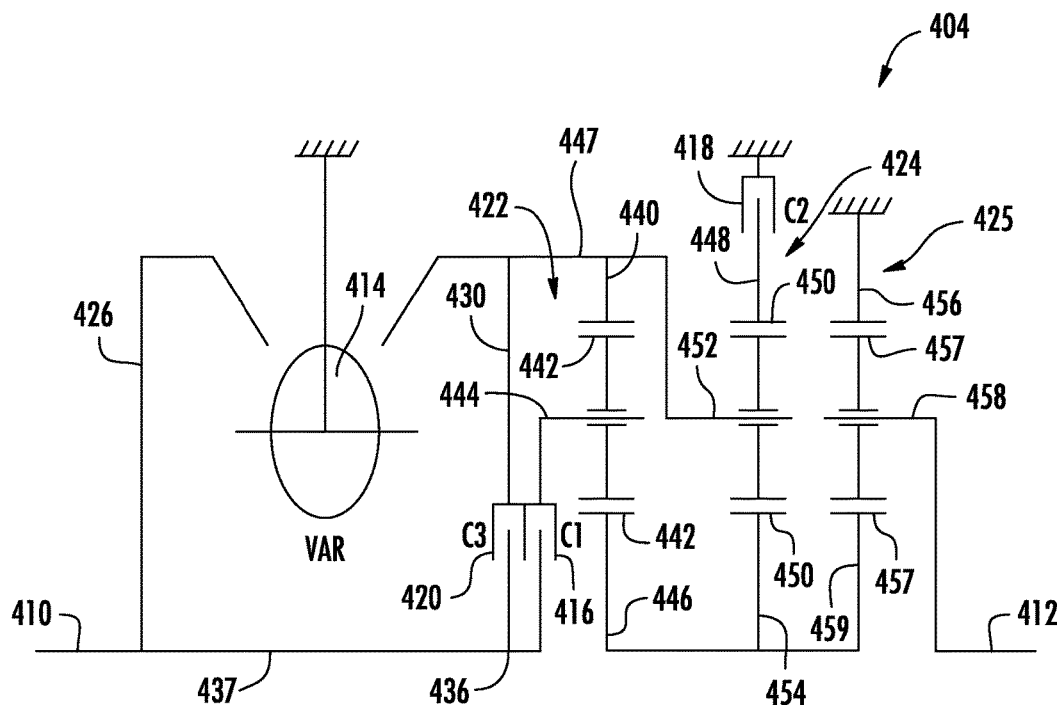
FIG. 12B is a schematic of the architecture of the infinitely variable transmission of FIG. 12A and the associated transmission components.

Referring now to FIG. 12A, the architecture of the transmission of FIG. 9 is shown in a third configuration 405 in the fourth embodiment of the disclosure. For the purposes of clarity, the transmission of the fourth embodiment is designated as the "transmission 404." The components of the transmission 404 (i.e., the clutches, gearsets, and the variator) as shown in FIGS. 12A-12B are identical to the components of the transmission 304 as shown in FIGS. 11A-11B and also to the components of the transmission 204 as shown in FIGS. 10A-10B. As such, each component of the transmission 404 having a "400" series label corresponds to the component of the transmission 304 having a "300" series label, and also to the component of the transmission 204 having a "200" series label. For example, the variator 414 of the transmission 404 corresponds to the variator 314 of the transmission 304 and also to the variator 214 of the transmission 204. Given those similarities, it should be appreciated that the transmission 404 may be substituted for the transmission 204 in the motor vehicle 200 shown in FIG. 9. In addition, the power paths defined by the architecture of the transmission 404 are identical to the power paths defined by the architecture of the transmission 304 (i.e., the power paths 433, 435 of the transmission 404 are identical to the power paths 333, 335 of the transmission 304).

Referring now to FIG. 12B, the variator 414, the plurality of gearsets 421, and the plurality of clutches 415 are physically arranged between the input shaft 410 and the output shaft 412 of the transmission 404. In the illustrative physical arrangement of the transmission 404, the variator 414 is positioned in front of the plurality of clutches 415 and the plurality of gearsets 421 relative to the input shaft 410 as shown in FIG. 12B.

The first gearset 422 of the plurality of gearsets 421 is configured to receive power from the input shaft 410 that is transmitted to the junction 436 and thereafter to the first gearset 422 as shown in FIG. 12B. The first gearset 422 is illustratively a simple planetary gearset that includes a ring gear 440, a plurality of planet gears 442, a carrier 444, and a sun gear 446. Each of the planet gears 442 is intermeshed with the ring gear 440 and the sun gear 446, and each of the planet gears 442 is supported for rotation by the carrier 444. The first clutch 416 is engageable to couple the carrier 444 to the input shaft 410 so that power is transmitted from the junction 436 to the first gearset 422 as shown in FIG. 12B. Both the ring gear 440 and the sun gear 446 are coupled to the second gearset 424 as shown in FIG. 12B. The ring gear 440 is coupled to the output ring 430 of the variator 414.

The second gearset 424 of the plurality of gearsets 421 is configured to receive power from the input shaft 410 that is transmitted to the junction 436 and thereafter to the second gearset 424 as shown in FIG. 12B. The second gearset 424 is illustratively a simple planetary gearset that includes a ring gear 448, a plurality of planet gears 450, a carrier 452, and a sun gear 454. Each of the planet gears 450 is intermeshed with the ring gear 448 and the sun gear 454, and each of the planet gears 450 is supported for rotation by the carrier 452. The carrier 452 is coupled to the ring gear 440 of the first gearset 422, and the sun gear 454 is coupled to both the sun gear 446 of the first gearset 422 and the third gearset 425. The second clutch 418 is engageable to couple the ring gear 448 to a stationary, non-rotating part of the transmission 404, thereby preventing the ring gear 448 from rotating (i.e., braking the ring gear 448). For instance, the second clutch 418 may be engaged to couple the ring gear 448 to the housing of the transmission 404. As such, the second clutch 418 is a non-rotating, stationary clutch.

The third gearset 425 of the plurality of gearsets 421 is configured to receive power from the input shaft 410 that is transmitted to the junction 436 and thereafter to the third gearset 425 as shown in FIG. 12B. The third gearset 425 is illustratively a simple planetary gearset that includes a ring gear 456, a plurality of planet gears 457, a carrier 458, and a sun gear 459. Each of the planet gears 457 is intermeshed with the ring gear 456 and the sun gear 459, and each of the planet gears 457 is supported for rotation by the carrier 458. The carrier 458 is coupled to the output shaft 412, and the sun gear 459 is coupled to the sun gear 454 of the second gearset 424. The ring gear 456 is coupled to a stationary, non-rotating part of the transmission 404, such as the housing of the transmission 404.

Referring now to FIGS. 13A-15B, power flows through the transmission 204 for each of the operating modes discussed above are shown in greater detail. Beginning with the reverse ratio range of "Mode 1" of table 160, power flows from the input shaft 210 to the output shaft 212 of the transmission 204 as shown in FIG. 13A. The first clutch 216 is engaged in the "Mode 1" operating mode, and input power 270 (designated by the solid arrows) flows from the input shaft 210 to the junction 236 and thereafter to the junction 238 through the variator 214. Input power 270 flowing to the junction 238 is transmitted to the first gearset 222 where the input power 270 is modified by the "mixing" gearset 222 such that some of the power that is output from the first gearset 222 is transmitted to the third gearset 225 and some of the power is transmitted to the junction 236, as described in greater detail below.

As shown in FIG. 13A, the power transmitted from the first gearset 222 to the third gearset 225 has been designated input power 272 (shown in dashed). Input power 272 is transmitted from the first gearset 222 to the third gearset 225 through the first clutch 216 and the junction 239, and input power 272 reaching the third gearset 225 is transmitted thereafter to the output shaft 212. In that way, power received from the drive unit 202 via the input shaft 210 is transmitted to the output shaft 212 in the reverse ratio range covered by the "Mode 1" operating mode.

Recirculated power 274 (designated by the dotted arrows) is transmitted from the first gearset 222 back to the junction 236. At the junction 236, recirculated power 274 is combined with input power 270 received from the input shaft 210. Recirculated power 274 then flows in parallel with input power 270 from the junction 236 through the variator 214 to the first gearset 222 in identical fashion to input power 270. Hereafter, the combination of input power 270 and recirculated power 274 is referred to as "combined power" and is understood to be greater than input power 270 and recirculated power 274.

The "mixing" gearset 222 breaks up the combined power into split power 276 (designated by the slashed arrows), which is transmitted to the gearset 225 and back to the junction 236, as shown in FIG. 13A. In this way, some split power 276 flows from the first gearset 222 to the output shaft 212 through the first clutch 216 and the third gearset 225 (like input power 272), thereby adding to the power transmitted to the output shaft 212. Some split power 276 also flows from the first gearset 222 to the junction 236 and, like recirculated power 274, back through the variator 214 to the first gearset 222 in parallel with input power 270.

Turning to the forward ratio range of "Mode 1," power flows from the input shaft 210 to the output shaft 212 of the transmission 204 as shown in FIG. 13B. Input power 270 flows from the input shaft 210 to the junction 236 and therefrom to the first gearset 222 as shown in FIG. 13B. Input power 270 reaching the first gearset 222 is modified by the "mixing" gearset 222 such that some of the power that is output from the first gearset 222 is transmitted to the third gearset 225 and some of the power is transmitted to the junction 236, as described in greater detail below.

As shown in FIG. 13B, the power transmitted from the first gearset 222 to the third gearset 225 has been designated input power 272 (shown in dashed). Input power 272 is transmitted from the first gearset 222 to the third gearset 225 through the second clutch 216 and the junction 239, and input power 272 reaching the third gearset 225 is transmitted to the output shaft 212 as shown in FIG. 13B. In that way, power received from the drive unit 202 via the input shaft 210 is transmitted to the output shaft 212 in the forward ratio range covered by the "Mode 1" operating mode.

Recirculated power 274 (designated by the dotted arrows) is transmitted from the first gearset 222 back to the junction 236 through the variator 214 and the junction 238 as shown in FIG. 13B. At the junction 236, recirculated power 274 is combined with input power 270 received from the input shaft 210. Recirculated power 274 then flows in parallel with input power 270 from the junction 236 to the first gearset 222 in identical fashion to input power 270. Hereafter, the combination of input power 270 and recirculated power 274 is referred to as "combined power" and is understood to be greater than input power 270 and recirculated power 274.

The "mixing" gearset 222 breaks up the combined power into split power 276 (designated by the slashed arrows), which is transmitted to the gearset 225 and back to the junction 236, as shown in FIG. 13B. In this way, some split power 276 flows from the first gearset 222 to the output shaft 212 through the first clutch 216 and the third gearset 225 (like input power 272), thereby adding to the power transmitted to the output shaft 212. Some split power 276 also flows from the first gearset 222 to the junction 236 through the junction 238 and the variator 214 and, like recirculated power 274, back to the first gearset 222 in parallel with input power 270.

Figure 14A:
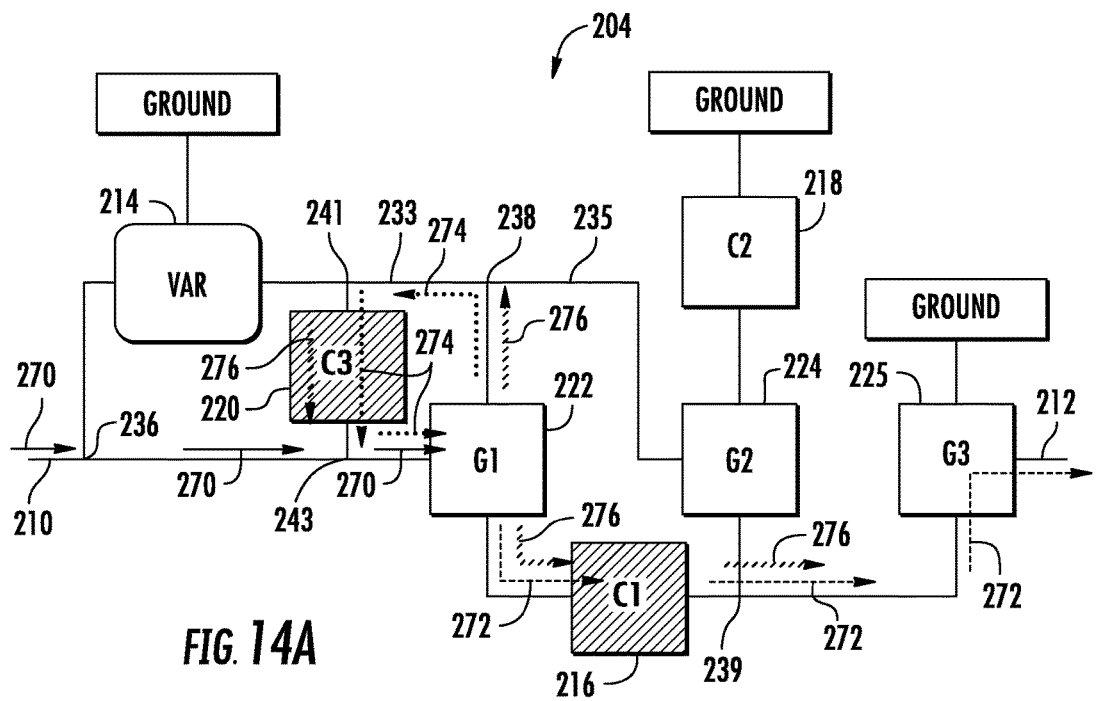
FIG. 14A is a block diagrammatic view of the infinitely variable transmission of FIG. 10A showing power flow therethrough in a first variator bypass operating mode.

Turning now to the "Bypass 1" operating mode of table 160, power flows from the input shaft 210 to the output shaft 212 as shown in FIG. 14A. Input power 270 flows from the input shaft 210 to the junction 236 and thereafter to the first gearset 222 through a junction 243. Input power 270 reaching the first gearset 122 is modified by the "mixing" gearset 222 such that some of the power that is output from the first gearset 222 is transmitted to the third gearset 225 and some of the power is transmitted to the junction 243, as described in detail below.

As shown in FIG. 14A, the power transmitted from the first gearset 222 to the third gearset 225 has been designated input power 272 (shown in dashed). Input power 272 is transmitted from the first gearset 222 to the third gearset 225 through the first clutch 216 and the junction 239, and input power 272 reaching the third gearset 225 is transmitted to the output shaft 212 as shown in FIG. 14A. In that way, power received from the drive unit 202 via the input shaft 210 is transmitted to the output shaft 212 in the "Bypass 1" operating mode.

Recirculated power 274 (designated by the dotted arrows) is transmitted from the first gearset 222 back to the junction 243 through the junctions 238, 241 and the variator bypass clutch 220 as shown in FIG. 14A. At the junction 243, recirculated power 274 is combined with input power 270 received from the input shaft 210. Recirculated power 274 then flows in parallel with input power 270 from the junction 243 to the first gearset 222 in identical fashion to input power 270. Hereafter, the combination of input power 270 and recirculated power 274 is referred to as "combined power" and is understood to be greater than input power 270 and recirculated power 274.

The "mixing" gearset 222 breaks up the combined power into split power 276 (designated by the slashed arrows), which is transmitted to the gearset 225 and back to the junction 243, as shown in FIG. 14A. In this way, some split power 276 flows from the first gearset 222 to the output shaft 212 through the first clutch 216 and the third gearset 225 (like input power 272), thereby adding to the power transmitted to the output shaft 212. Some split power 276 also flows from the first gearset 222 to the junction 243 through the junctions 238, 241 and the variator bypass clutch 220 and, like recirculated power 274, back to the first gearset 222 in parallel with input power 270.

Figure 14B:
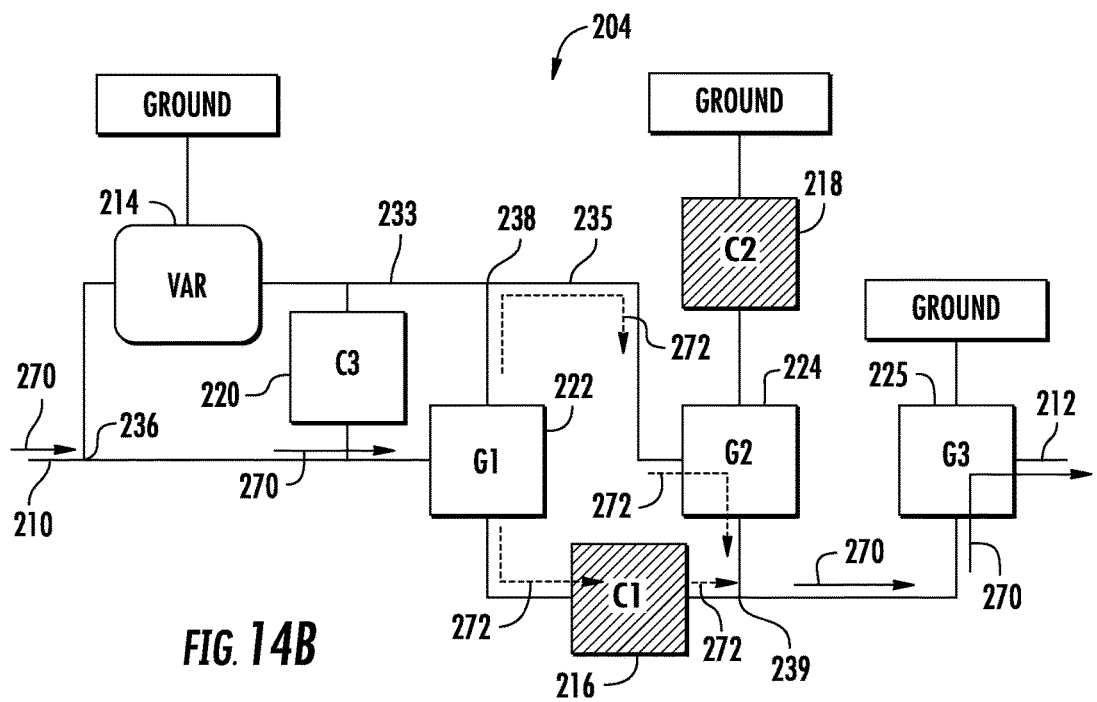
FIG. 14B is a block diagrammatic view of the infinitely variable transmission of FIG. 10A showing power flow therethrough in a first synchronous operating mode.

Turning now to the "Sync 1-2" operating mode of table 160, power flows from the input shaft 210 to the output shaft 212 as shown in FIG. 14B. Input power 270 flows from the input shaft 210 to the junction 236 and thereafter to the first gearset 222. Input power 270 reaching the first gearset 222 is modified by the "mixing" gearset 222 such that some of the power that is output from the first gearset 222 is transmitted to the second gearset 224 and some of the power is transmitted to the first clutch 216, as described in detail below.

As shown in FIG. 14B, the power transmitted from the first gearset 222 to the second gearset 224 is designated input power 272 (shown in dashed). In addition, the power transmitted from the first gearset 222 to the first clutch 216 is designated input power 272. Input power 272 flows from the second gearset 224 to the junction 239 and also from the first clutch 216 to the junction 239. As such, input power 270 is reconstituted at the junction 239, and input power 270 reconstituted at the junction 239 flows to the output shaft 212 through the third gearset 225 as shown in FIG. 14B. In that way, power received from the drive unit 202 via the input shaft 210 is transmitted to the output shaft 212 in the "Sync 1-2" operating mode.

Figure 15A:
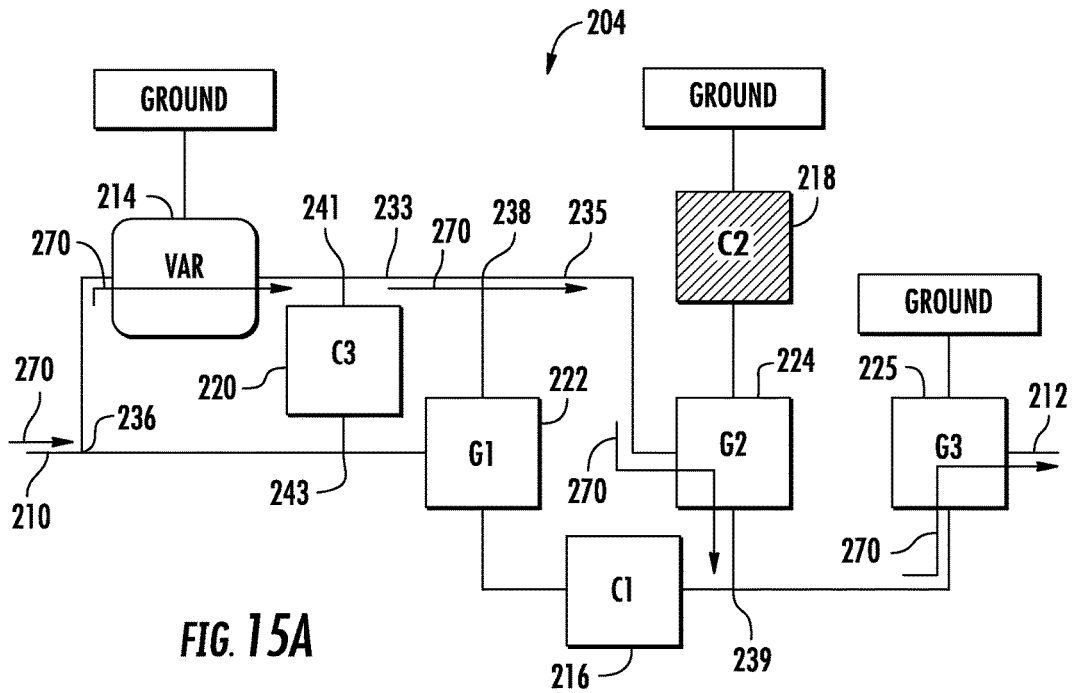
FIG. 15A is a block diagrammatic view of the infinitely variable transmission of FIG. 10A showing power flow therethrough in a second forward operating mode.

Turning now to the "Mode 2" operating mode of table 160, power flows from the input shaft 210 to the output shaft 212 as shown in FIG. 15A. Input power 270 flows from the input shaft 210 to the junction 236 and thereafter to the junction 138 through the variator 214 and the junction 241. Input power 270 reaching the junction 238 is transmitted to the junction 239 through the second gearset 224, and input power 270 reaching the junction 239 is transmitted to the output shaft 112 through the third gearset 225 as shown in FIG. 15A.

Figure 15B:
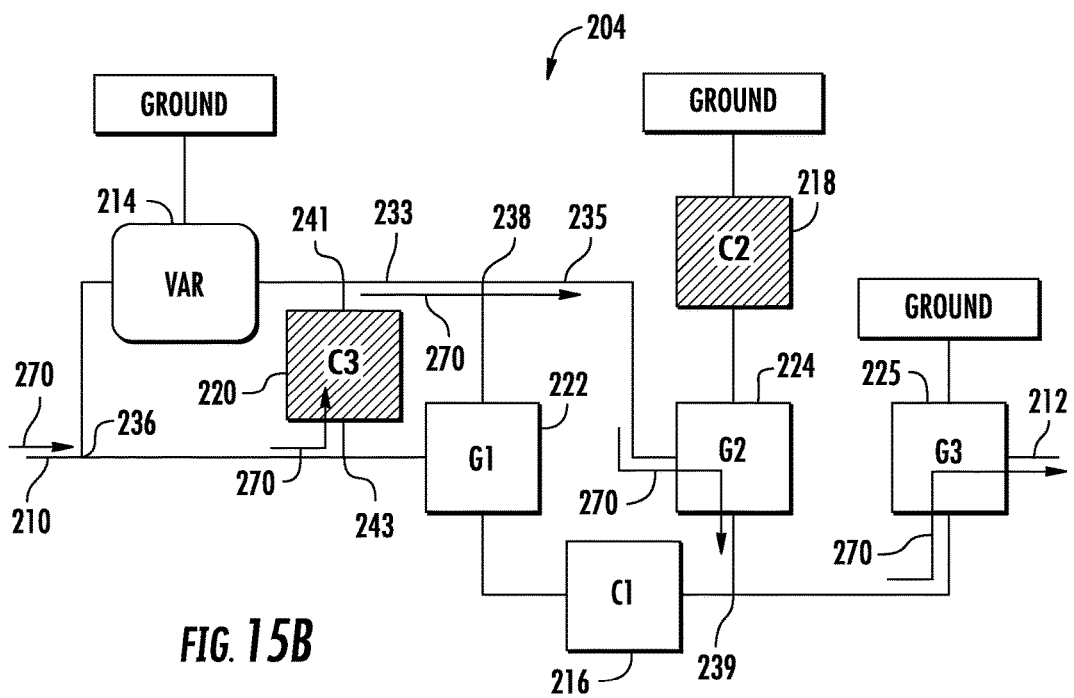
FIG. 15B is a block diagrammatic view of the infinitely variable transmission of FIG. 10A showing power flow therethrough in a second variator bypass operating mode.

Turning now to the "Bypass 2" operating mode of table 160, power flows from the input shaft 210 to the output shaft 212 as shown in FIG. 15B. Input power 270 flows from the input shaft 210 to the junction 236 and thereafter to the junction 241 through the junction 243 and the variator bypass clutch 220. Input power 270 reaching the junction 241 is transmitted to the junction 239 through the junction 238 and the second gearset 224, and input power 270 reaching the junction 239 is transmitted to the output shaft 212 through the third gearset 225 as shown in FIG. 15B.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A transmission comprising:
a housing,
an input shaft configured to receive torque from a drive unit,
an output shaft configured to transmit torque to a load,
a first gearset arranged between the input shaft and the output shaft, the first gearset being configured to receive torque from the input shaft,
a second gearset coupled to the first gearset between the input shaft and the output shaft, a variable-ratio unit configured to transmit power between (i) a first member coupled to the input shaft and a first element of the first gearset and (ii) a second member coupled to a second element of the first gearset, a first torque transmitting mechanism arranged between the second gearset and the housing, the first torque transmitting mechanism being moveable between (i) a disengaged position in which the second gearset is decoupled from the housing and (ii) an engaged position in which the second gearset is coupled to the housing such that torque is transmitted through the second gearset, and a bypass torque transmitting mechanism arranged between the first member and the second member, the bypass torque transmitting mechanism being moveable between (i) a disengaged position in which the first member is decoupled from the second member and (ii) an engaged position in which the first member is coupled to the second member such that the variable-ratio unit is bypassed and torque is transmitted between the first member and the second member through the bypass torque transmitting mechanism.

2. The transmission of claim 1, further comprising a second torque transmitting mechanism arranged between the second member and the output shaft, the second torque transmitting mechanism being moveable between (i) a disengaged position in which the second member is decoupled from the output shaft and (ii) an engaged position in which the second member is coupled to the output shaft such that torque is transmitted from the second member to the output shaft through the second torque transmitting mechanism.

3. The transmission of claim 2, wherein when the first torque transmitting mechanism is in the engaged position and the bypass and second torque transmitting mechanisms are in their respective disengaged positions, the variable-ratio unit is operable to provide a first range of speed ratios.

4. The transmission of claim 3, wherein when the second torque transmitting mechanism is in the engaged position and the first and bypass torque transmitting mechanisms are in their respective disengaged positions, the variable-ratio unit is operable to provide a second range of speed ratios.

5. The transmission of claim 4, wherein the first range of speed ratios and the second range of speed ratios overlap.

6. The transmission of claim 3, wherein (i) the transmission is operable to provide a first plurality of input speeds at the input shaft and a second plurality of output speeds at the output shaft, and (ii) the first range of speed ratios include a ratio in which one of the second plurality of output speeds is equal to zero for the first plurality of input speeds.

7. The transmission of claim 2, wherein when the first torque transmitting mechanism and the second torque transmitting mechanism are in their respective engaged positions, a fixed speed ratio is defined between the input shaft and the output shaft.

8. The transmission of claim 2, wherein when the bypass torque transmitting mechanism is in the engaged position and one of the first and second torque transmitting mechanisms is in the engaged position, a fixed speed ratio is defined between the input shaft and the output shaft.

9. The transmission of claim 1, wherein each of the first and second gearsets includes a sun gear, a ring gear, a carrier, and a plurality of planet gears.

10. The transmission of claim 9, wherein the sun gear of the first gearset is coupled to the sun gear of the second gearset.

11. The transmission of claim 1, wherein the first member couples an input ring of the variable-ratio unit to the input shaft and the first element of the first gearset.

12. The transmission of claim 11, wherein the second member couples an output ring of the variable-ratio unit to the second element of the first gearset.

13. A transmission comprising:

a housing, an input shaft configured to receive torque from a drive unit, an output shaft configured to transmit torque to a load, a first planetary gearset arranged between the input shaft and the output shaft, the first planetary gearset being configured to receive torque from the input shaft, the first planetary gearset including a first member coupled to the input shaft, a second member, and a third member, a second planetary gearset arranged between the first planetary gearset and the output shaft, the second planetary gearset being configured to receive torque output from the first planetary gearset, the second planetary gearset including a first member coupled to the second member of the first planetary gearset, a second member, and a third member, a variable-ratio unit arranged between the input shaft and the first planetary gearset, the variable-ratio unit coupled to the input shaft, a second torque transmitting mechanism arranged between the second planetary gearset and the housing, the second torque transmitting mechanism being moveable between (i) a disengaged position in which the second member of the second planetary gearset is decoupled from the housing and (ii) an engaged position in which the second member of the second planetary gearset is coupled to the housing such that torque is transmitted from the first planetary gearset to the output shaft through the second planetary gearset, and a first torque transmitting mechanism arranged between the third member of the first planetary gearset and the third member of the second planetary gearset, the first torque transmitting mechanism being moveable between (i) a disengaged position in which the third member of the first planetary gearset is decoupled from the third member of the second planetary gearset and (ii) an engaged position in which the third member of the first planetary gearset is coupled to the third member of the second planetary gearset such that torque is transmitted from the third member of the first planetary gearset to the third member of the second planetary gearset through the second torque transmitting mechanism and thereafter to the output shaft.

* * * * *